US012801068B2

(12) United States Patent
Shimada et al.

(10) Patent No.: US 12,801,068 B2
(45) Date of Patent: Nov. 17, 2026

(54) HEATING DEVICE INCLUDING A HOLDER HAVING A SLIT FOR ROUTING AN ELECTRIC WIRE INTO A WIRING SPACE, FIXING DEVICE, AND IMAGE FORMING APPARATUS

(71) Applicants: Hiroyuki Shimada, Kanagawa (JP); Takuya Seshita, Kanagawa (JP); Yuusuke Furuichi, Kanagawa (JP); Yukimichi Someya, Kanagawa (JP)

(72) Inventors: Hiroyuki Shimada, Kanagawa (JP); Takuya Seshita, Kanagawa (JP); Yuusuke Furuichi, Kanagawa (JP); Yukimichi Someya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/180,132

(22) Filed: Apr. 16, 2025

(65) Prior Publication Data

US 2026/0079431 A1 Mar. 19, 2026

(30) Foreign Application Priority Data

Apr. 22, 2024 (JP) ................................ 2024-068982

(51) Int. Cl.
*G03G 15/20* (2006.01)
*G03G 15/00* (2006.01)
*G03G 21/16* (2006.01)

(52) U.S. Cl.
CPC ..... *G03G 15/2053* (2013.01); *G03G 15/2064* (2013.01); *G03G 15/55* (2013.01); *G03G 21/1647* (2013.01); *G03G 2215/2035* (2013.01)

(58) Field of Classification Search
CPC ........... G03G 15/2053; G03G 15/2064; G03G 15/55; G03G 21/1647; G03G 2215/2035
See application file for complete search history.

(56) References Cited

U.S. PATENT DOCUMENTS 9,141,050 B2 * 9/2015 Kasuya .............. G03G 15/2053
2021/0026279 A1 1/2021 Takahashi et al.
2021/0041811 A1 2/2021 Shimada
(Continued)

FOREIGN PATENT DOCUMENTS

JP 2014-186308 A 10/2014

OTHER PUBLICATIONS

U.S. Appl. No. 18/773,593, filed Jul. 16, 2024.
U.S. Appl. No. 18/928,550, filed Oct. 28, 2024.

*Primary Examiner* — Hoang X Ngo
(74) *Attorney, Agent, or Firm* — XSENSUS LLP

(57) ABSTRACT

A heating device includes: a rotator; a heater extending in a first direction to heat the rotator; a temperature detector to detect a temperature of the heater; a holder holding the temperature detector; an electric wire; and a biasing member to bias the temperature detector toward the heater via the holder in a second direction intersecting the first direction. The holder includes: a pair of supports parallel to each other in a third direction intersecting the first direction and the second direction, the pair of supports extend in the first direction; a wiring space between the pair of supports and accommodatable a part of the electric wire; and a slit between the pair of supports and communicating with the wiring space, the slit being insertable the electric wire to the wiring space.

9 Claims, 20 Drawing Sheets

(56) References Cited

U.S. PATENT DOCUMENTS

| | | | |
|---|---|---|---|
| 2022/0299919 | A1 | 9/2022 | Inoue et al. |
| 2022/0299920 | A1 | 9/2022 | Shimada et al. |
| 2022/0308511 | A1 | 9/2022 | Someya et al. |
| 2022/0382192 | A1 | 12/2022 | Inoue et al. |
| 2023/0063779 | A1 | 3/2023 | Shimada et al. |
| 2023/0081075 | A1 | 3/2023 | Someya et al. |
| 2023/0185222 | A1 | 6/2023 | Furuichi et al. |
| 2023/0288855 | A1 | 9/2023 | Hiroyuki et al. |
| 2023/0297016 | A1 | 9/2023 | Someya et al. |
| 2023/0305457 | A1 | 9/2023 | Someya et al. |
| 2023/0408959 | A1 | 12/2023 | Someya et al. |
| 2024/0302773 | A1 | 9/2024 | Shimada et al. |
| 2024/0319640 | A1 | 9/2024 | Kabata et al. |
| 2024/0319641 | A1 | 9/2024 | Andoh et al. |
| 2024/0319642 | A1 | 9/2024 | Samei et al. |

* cited by examiner

HEATING DEVICE INCLUDING A HOLDER HAVING A SLIT FOR ROUTING AN ELECTRIC WIRE INTO A WIRING SPACE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2024-068982, filed on Apr. 22, 2024, in the Japan Patent Office, the entire disclosure of which is hereby incorporated by reference herein.

BACKGROUND

Technical Field

The present embodiment relates to a heating device, a fixing device, and an image forming apparatus.

Related Art

A fixing device serving as a heating device is provided with, to appropriately control a temperature of a fixing belt (rotator), a temperature detector that causes a temperature detection element to come into contact with a heating body or the like in the fixing device to detect its temperature, a holder that holds the temperature detector, and a biasing member that biases the temperature detector toward a detection-target member via the holder, for example. The holder is provided with a wiring space for allowing an electric wire or the like attached to another temperature detector in the fixing device to pass through.

SUMMARY

The present disclosure described herein provides a heating device including: a rotator; a heater extending in a first direction to heat the rotator; a temperature detector to detect a temperature of the heater; a holder holding the temperature detector; an electric wire; and a biasing member to bias the temperature detector toward the heater via the holder in a second direction intersecting the first direction. The holder includes: a pair of supports parallel to each other in a third direction intersecting the first direction and the second direction, the pair of supports extend in the first direction; a wiring space between the pair of supports and accommodatable a part of the electric wire; and a slit between the pair of supports and communicating with the wiring space, the slit being insertable the electric wire to the wiring space.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 5A to 5C are views illustrating a thermistor holder, in particular, a portion that holds a thermistor, in which FIG. 5A is a plan view; FIG. 5B is a side view; and FIG. 5C is a cross-sectional view taken along a line A-A illustrated in FIG. 5A;

FIGS. 7A to 7C are views illustrating the thermistor, in which FIG. 7A is a plan view; FIG. 7B is a rear view; and FIG. 7C is a side view;

Figure 1:
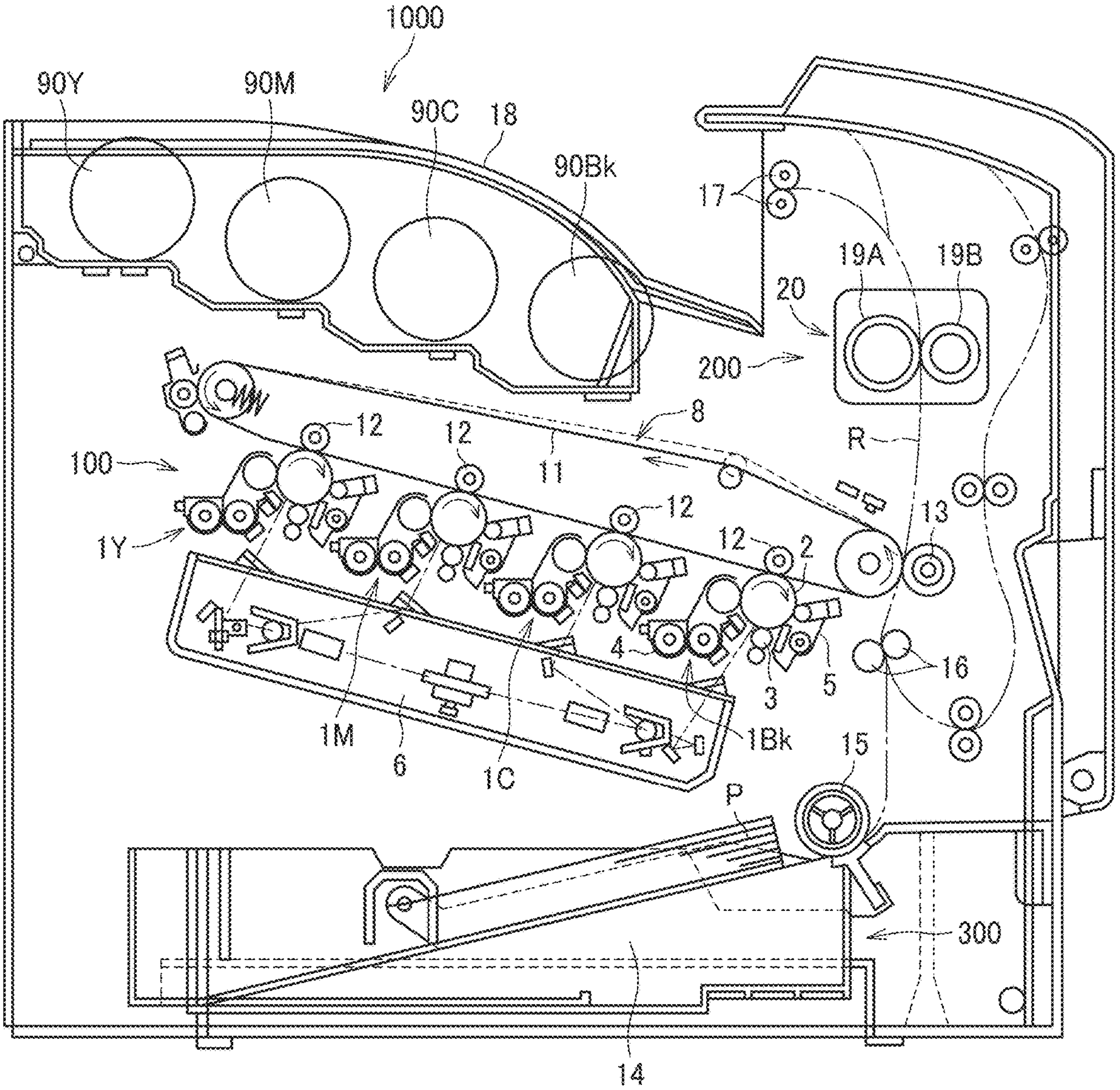
FIG. 1 is a schematic configuration diagram of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A present embodiment will now be described herein with reference to the accompanying drawings. Identical or corresponding portions in the drawings are applied with identical reference numerals, and redundant descriptions are appropriately simplified or omitted. A fixing device provided in an image forming apparatus, which serves as a heating device according to the present embodiment, will now be described herein.

Overall Configuration of Image Forming Apparatus

FIG. 1 is a schematic configuration diagram of an image forming apparatus 1000. The term "image forming apparatus" included and referred in the present specification is one of or a multifunction peripheral including a combination of at least two of a printer, a copier, a facsimile machine, and a printing machine. The term "image formation" used as described below means not only formation of an image of a character or a graphic having a meaning, for example, but also formation of an image of a pattern having no meaning, for example. An overall configuration and operation of the image forming apparatus will now be described herein with reference to FIG. 1.

As illustrated in FIG. 1, the image forming apparatus 1000 includes an image forming apparatus 100, a fixer 200, a sheet supplier 300, and a sheet ejector 400.

Image Forming Portion

The image forming apparatus 100 forms an image on a sheet serving as a recording medium. The image forming apparatus 100 includes four image forming units 1Y, 1M, 1C, and 1Bk, an exposure device 6, and a transfer device 8.

Each of the four image forming units 1Y, 1M, 1C, and 1Bk includes an electrostatic latent image bearer 2, a charging member 3, a developing device 4, and a cleaning device 5.

The electrostatic latent image bearer 2 is a rotator having a surface that bears an electrostatic latent image. One used as the electrostatic latent image bearer 2 is, for example, a photoconductor drum or an endless type photoconductor belt.

The charging member 3 is a member that causes the surface of the electrostatic latent image bearer 2 to be charged with electricity. There is no limitation in particular as long as the charging member 3 is able to apply a voltage and cause the surface of the electrostatic latent image bearer 2 to be uniformly charged with electricity, and appropriate selection is possible according to a purpose. Specifically, a contact type charging member such as a charging roller, a magnetic brush, a fur brush, a film, or a rubber blade having electric conductivity or semi-electric conductivity or a non-contact type charging member utilizing corona discharge may be used.

The developing device 4 is a device that supplies toner serving as a developer to the electrostatic latent image on the electrostatic latent image bearer 2 to form a toner image. The developing device 4 accommodates a type of toner (developer), which differs in color per each of the image forming units 1Y, 1M, 1C, and 1Bk, such as yellow, magenta, cyan, or black corresponding to a color separation component of a color image.

The cleaning device 5 removes the toner and other foreign matter remaining on the electrostatic latent image bearer 2. The cleaning device 5 is provided with a cleaning blade or the like, which comes into contact with the surface of the electrostatic latent image bearer 2.

The exposure device 6 is a device that allows a charged surface of the electrostatic latent image bearer 2 to be exposed with light to form an electrostatic latent image. There is no limitation in particular as long as the exposure device 6 is able to allow the charged surface of the electrostatic latent image bearer 2 to be exposed with light, and appropriate selection is possible according to a purpose. Specifically, the exposure device may vary in type such as a copying optical system, a rod lens array system, a laser optical system, a liquid crystal shutter optical system, or a light-emitting diode (LED) optical system.

Toner bottles 90Y, C, M, and K are detachably attached to an upper part of the image forming apparatus 1000. The toner bottles 90Y, C, M, and K are respectively filled with toners of colors of yellow, cyan, magenta, and black. From each of the toner bottles 90Y, C, M, and K, each type of toner in each color is supplied to the developing device 4 corresponding to the color via a supply path provided between each toner bottle and the developing device 4.

The transfer device 8 is a device that transfers an image onto a sheet. The transfer device 8 includes an intermediate transfer belt 11, primary transfer rollers 12, and a secondary transfer roller 13. The intermediate transfer belt 11 is an endless type belt member stretched by a plurality of support rollers. The primary transfer rollers 12 provided inside the intermediate transfer belt 11 are four in number. As each of the primary transfer rollers 12 comes into contact with each of the electrostatic latent image bearers 2 via the intermediate transfer belt 11, a primary transfer nip is formed between the intermediate transfer belt 11 and each of the electrostatic latent image bearer 2. The secondary transfer roller 13 comes into contact with an outer circumferential surface of the intermediate transfer belt 11. As a result, a secondary transfer nip is formed between the secondary transfer roller 13 and the intermediate transfer belt 11.

The intermediate transfer belt 11 may have a single layer structure or a multilayer structure, and may preferably include polyvinylidene fluoride, polycarbonate, polyimide, or the like in a case of the single layer structure. In a case of the multilayer structure, for example, a base layer may preferably include a fluororesin, a polyvinylidene fluoride sheet, or a polyimide-based resin, which presents less elongation, and its surface is covered with a coating layer including a fluorine-based resin that presents good smoothness.

Fixer

The fixer 200 includes a fixing device 20 that heats a sheet to fix an image on the sheet. The fixing device 20 includes a pair of rotators 19A and 19B that are in contact with each other, a heater that heats at least one of the pair of rotators 19A and 19B, and the like.

Sheet Supplier

The sheet supplier 300 supplies a sheet to the image forming apparatus 100. The sheet supplier 300 includes a sheet feeding cassette 14 that stores paper sheets P serving as sheets, and a sheet feeding roller 15 that feeds each of the paper sheets P from the sheet feeding cassette 14. The term “sheet” includes not only paper sheet but also overhead projector (OHP) sheet, fabric, metallic sheet, plastic film, and prepreg sheet in which a resin is allowed to impregnate into carbon fibers beforehand. The term “paper sheet” includes not only plain paper but also thick paper, postcard, envelope, thin paper, coated paper (e.g., coating paper and art paper), and tracing paper.

Sheet Ejector

The sheet ejector 400 is a portion that ejects a paper sheet P to outside of the apparatus. The sheet ejector 400 includes a pair of sheet ejection rollers 17 that ejects the paper sheet P and a sheet ejection tray 18 on which the paper sheet P ejected by the sheet ejection rollers 17 is placed.

Image Formation Operation

Operation of the image forming apparatus 1000 will now be described herein with reference to FIG. 1.

When image formation operation is started due to an instruction from an operation panel or an external terminal, the electrostatic latent image bearer 2 starts to rotate in each of the image forming units 1Y, 1M, 1C, and 1Bk. Each of the charging members 3 causes the surface of each of the electrostatic latent image bearers 2 to be charged with electricity to have a uniform high potential. Based on image information of a document read by a document reading device or print image information instructed from an external terminal, the exposure device 6 allows the surface (charged surface) of each of the electrostatic latent image bearers 2 to be exposed with light. As a result, the potential at an exposed portion lowers, forming an electrostatic latent image on the surface of each of the electrostatic latent image bearers 2. The toner is supplied from each of the developing devices 4 to each of the electrostatic latent image bearers 2, and a toner image in different color is formed on each of the electrostatic latent image bearers 2.

The toner image on each of the electrostatic latent image bearers 2 reaches the primary transfer nip (position of the primary transfer rollers 12) as the electrostatic latent image bearer 2 rotates. At the primary transfer nip, the toner images are sequentially transferred and overlapped with each other respectively from the electrostatic latent image bearers 2 onto the intermediate transfer belt 11 that is rotated and driven. A full-color toner image is formed on the intermediate transfer belt 11. Image formation is not limited to a case where all the four image forming units 1Y, 1M, 1C, and 1Bk are used to from a full-color image, but it is possible to use any one of the image forming units 1Y, 1M, 1C, and 1Bk to form a monochrome image and any two or three of the image forming units are used to from an image in two or three colors. After the toner images are transferred to the intermediate transfer belt 11, the cleaning device 5 performs cleaning operation for each of the electrostatic latent image bearers 2. As a result, foreign matter such as the residual toner is removed from the surface of each of the electrostatic latent image bearers 2.

As the intermediate transfer belt 11 rotates, the toner image transferred onto the intermediate transfer belt 11 is conveyed to the secondary transfer nip (position of the secondary transfer roller 13). The toner image is transferred from the intermediate transfer belt 11 onto the paper sheet P at the secondary transfer nip. The paper sheet P has been supplied from the sheet supplier 300. Upon start of the image formation operation, the sheet feeding roller 15 rotates, and a paper sheet P is fed from the sheet feeding cassette 14. The fed paper sheet P comes into contact with a pair of timing rollers 16 before reaching the secondary transfer nip, and conveyance is temporarily stopped. As the pair of timing rollers 16 rotates at a predetermined timing, the paper sheet P is conveyed to the secondary transfer nip in synchronization in timing with the toner image on the intermediate transfer belt 11, and the toner image is transferred to the paper sheet P.

The paper sheet P to which the toner image has been transferred is conveyed to the fixer 200. In the fixer 200, the paper sheet P passes through between the pair of rotators 19A and 19B, the toner image on the paper sheet P is heated and pressed, and the toner image is fixed on the paper sheet P. The paper sheet P is conveyed to the sheet ejector 400, and is ejected by the sheet ejection rollers 17 onto the sheet ejection tray 18. As a result, a series of steps of the image formation operation ends.

Configuration of Fixing Device

Figure 2:
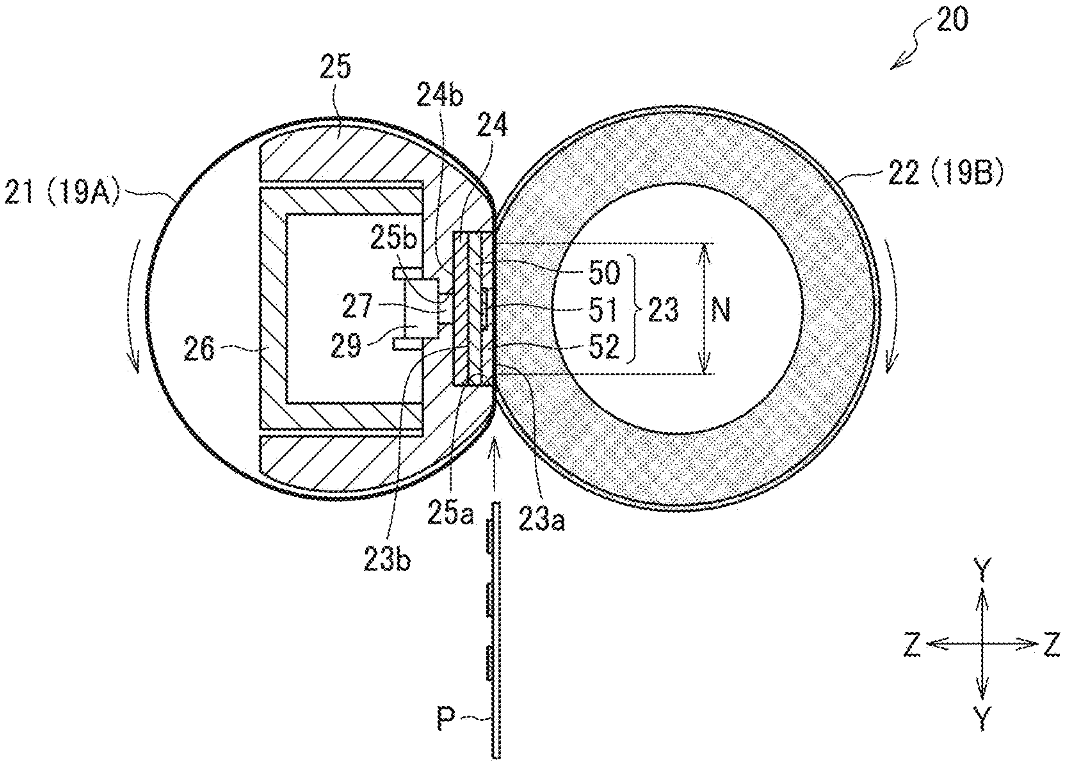
FIG. 2 is a schematic configuration diagram of a fixing device.

FIG. 2 is a schematic configuration diagram of the fixing device 20. In FIG. 2, a thermistor holder 29 and its peripheral structure are illustrated in a simplified manner.

As illustrated in FIG. 2, the fixing device 20 includes, in addition to the pair of rotators 19A and 19B, a heater 23 serving as a heating body, a heat equalizing plate 24 serving as a high thermal conductive member, a heater holder 25 serving as a heating body holder, a stay 26 serving as a support member, thermistors 27 serving as temperature detectors, and the thermistor holders 29 serving as holders, for example. The holder is a member that holds the temperature detectors.

One of the pair of rotators 19A and 19B, that is, the first rotator 19A is a fixing belt 21 disposed to face an unfixed-image bearing surface of a paper sheet P. The other one of the pair of rotators, that is, the second rotator 19B is a pressure roller 22 disposed to face the fixing belt 21. The fixing belt 21 and the pressure roller 22 are pressed by a pressing member such as a spring and are in contact with each other. As a result, a nip portion N is formed between the fixing belt 21 and the pressure roller 22.

Directions (directions X illustrated in FIG. 3) that are orthogonal to a paper surface of FIG. 2 are longitudinal directions of the fixing belt 21, the pressure roller 22, the heater 23, the heat equalizing plate 24, the heater holder 25, the stay 26, the thermistors 27, the thermistor holders 29, and the fixing device 20, and are also first directions in the present embodiment. The directions are also simply referred to as the longitudinal directions herein. The longitudinal directions are also belt width directions of the fixing belt 21, axial directions of the pressure roller 22, and width directions of a paper sheet to be conveyed. The width directions of a paper sheet are directions orthogonal to a conveyance direction and thickness directions of the paper sheet. Directions Y illustrated in FIG. 2 are lateral directions of the heater 23, the heat equalizing plate 24, the thermistors 27, the thermistor holders 29, and the like, the conveyance direction of the paper sheet and its opposite direction, and third directions in the present embodiment. Directions Z illustrated in FIG. 2 are thickness directions of the heater 23, the heat equalizing plate 24, and the like, a pressing direction of the pressure roller 22 with respect to the fixing belt 21, and a direction of biasing each of the thermistors 27, and second directions in the present embodiment. The directions X, Y, and Z are orthogonal to each other.

The fixing belt 21 includes a tubular base material and an endless type belt member having a release layer and the like provided on an outer circumferential surface of the base material. The base material includes, for example, a metal material such as nickel or stainless steel or a resin material such as polyimide. The release layer includes, for example, a material such as tetrafluoroethylene-perfluoroalkyl vinyl ether copolymer (PFA), polytetrafluoroethylene (PTFE), polyimide, polyetherimide, or polyether sulfide (PES). Since the fixing belt 21 includes the release layer, ability of separation of a toner image with respect to the fixing belt 21 is improved, suppressing winding of the paper sheet P with respect to the fixing belt 21. The fixing belt 21 may have an elastic layer between the base material and the release layer. As a material of the elastic layer, for example, a rubber material such as silicone rubber, foam silicone rubber, or fluororubber is used. Since formation of minute irregularities on a surface of the fixing belt 21 is suppressed when the fixing belt 21 has an elastic layer, heat is easily uniformly transferred to a toner image on a paper sheet P, improving fixing quality.

The pressure roller 22 includes a roller including a hollow or solid core material, an elastic layer provided on an outer circumferential surface of the core material, a release layer provided on an outer circumferential surface of the elastic layer, and the like. The core material includes a metal material such as iron. The elastic layer includes a material such as silicone rubber, foam silicone rubber, or fluororubber. The release layer includes a fluororesin such as PFA or PTFE.

The heater 23 is disposed to be in contact with an inner circumferential surface of the fixing belt 21 at the nip portion N. As the heater 23 pinches the fixing belt 21 with the pressure roller 22 to press the fixing belt 21, the nip portion N is formed between the fixing belt 21 and the pressure roller 22. In addition to the case of being in direct contact with the inner circumferential surface of the fixing belt 21, the heater 23 may be in contact with the inner circumferential surface via a low-friction sliding sheet. The term "contact" referred in the present specification includes, unless otherwise specified in particular, not only direct contact in which contact is achieved without another member interposed, but also indirect contact in which contact is achieved with another member interposed.

The heater 23 includes a base material 50, resistive heat generators 51, an insulating layer 52, and the like. The resistive heat generators 51 are provided on the base material 50 and covered with the insulating layer 52. When the resistive heat generators 51 are energized to generate heat, the heat is transferred to the inner circumferential surface of the fixing belt 21 via the insulating layer 52, heating the fixing belt 21. An orientation of the heater 23 may be changed to dispose the base material 50 to be in contact with the inner circumferential surface of the fixing belt 21. In this case, since heat of the resistive heat generators 51 is transferred to the fixing belt 21 via the base material 50, the base material 50 may preferably include a material having a high rate of thermal conductivity.

The base material 50 includes a non-metal material such as ceramic, glass, or mica, including alumina or aluminum nitride, which is excellent in heat resistance and insulation properties. It is possible to allow an insulating layer to be separately present in an interposed manner between the base material 50 and the resistive heat generators 51 to form the base material 50 including an electrically-conductive material such as metal. The metal material may preferably be aluminum, stainless steel, or the like from a viewpoint of low cost. To suppress unevenness in temperature in the heater 23 and to improve image quality, the base material 50 may include a material having a high rate of thermal conductivity such as copper, graphite, or graphene. Graphene is a substance formed into a sheet shape in which carbon atoms bond each other.

The resistive heat generators 51 are each formed with a method such as screen printing. For example, mixing silver palladium (AgPd), glass powder, and the like to prepare a paste, applying the paste onto the base material 50 through screen printing, and firing the base material 50 make it possible to form the resistive heat generators 51. In addition to silver palladium, a resistive material such as a silver alloy (AgPt) or ruthenium oxide ($RuO_2$) may be used as a material of the resistive heat generators 51. The insulating layer 52 includes, for example, heat-resistant glass.

The heat equalizing plate 24 is a member that assists movement of heat generated from the heater 23. The heat equalizing plate 24 includes a material that is higher in rate of thermal conductivity than the heater holder 25 and the like. The material of the heat equalizing plate 24 is copper, aluminum, graphene, or the like, and is, for example, an aluminum plate having a thickness of 0.3 mm. The heat equalizing plate 24 is disposed to be in contact with a surface 23*b* of the heater 23, which is opposite to a contact surface 23*a* with the rotator, which is in contact with the inner circumferential surface of the fixing belt 21. The heat equalizing plate 24 is not limited to a single-layer member, and may include a plurality of members that forms layers.

In particular, since the heat equalizing plate 24 is disposed to be in direct contact with the heater 23, the heat equalizing plate 24 makes it possible to allow heat of the heater 23 to be effectively dispersed. In general, heat of the nip portion N is difficult to be consumed in a non-passing-through region where a paper sheet P does not pass through, and, when paper sheets P each smaller in width than a heat generating region of the heater 23 are allowed to continuously pass through, the fixing belt 21 and the heater 23 may increase excessively in temperature in the non-passing-through region. However, in the present embodiment, since the heat equalizing plate 24 is provided, it is possible to allow heat of the nip portion N in the non-passing-through region to be dispersed to a peripheral area via the heat equalizing plate 24. As a result, it is possible to suppress a local increase in temperature in the fixing belt 21 and the heater 23. Since it is possible to allow heat of the nip portion N in the non-passing-through region to move to a passing-through region where paper sheets P pass through, it is possible to effectively use the heat as heat for fixing processing, and it is also possible to expect improved energy saving.

The heater holder 25 is a member that holds the heater 23 and the heat equalizing plate 24. The heater holder 25 has a recess 25*a* that accommodates the heater 23 and the heat equalizing plate 24. As the heater 23 and the heat equalizing plate 24 are accommodated in the recess 25*a* on the heater holder 25, the heater 23 and the heat equalizing plate 24 are restricted in movement in upper and lower directions and directions orthogonal to the paper surface of FIG. 2. The heater holder 25, which is easily heated to a high temperature due to heat of the heater 23, may preferably include a heat-resistant material. In particular, when the heater holder 25 includes a heat-resistant resin having low thermal conductivity such as liquid crystal polymer (LCP), unnecessary transfer of heat from the heater 23 to the heater holder 25 is suppressed, improving heating efficiency of the heater 23.

A through hole 25*b* passing through the heater holder 25 toward a back surface is provided in a partial region of the recess 25*a*. The thermistor 27 is in contact with a back surface 24*b* of the heat equalizing plate 24 via the through hole 25*b*.

The stay 26 is a support member that supports the heater holder 25. Since the stay 26 supports the heater holder 25 on a side opposite to the pressure roller 22, bending of the heater 23 due to a pressuring force of the pressure roller 22 is suppressed, and the nip portion N having a uniform width is obtained. A material of the stay 26 may preferably be an iron-based metal material such as SUS or SECC for securing rigidity.

Operation of Fixing Device

The fixing device 20 operates as described below.

Upon start of the image formation operation, the pressure roller 22 starts to rotate in an arrow direction illustrated in FIG. 2, and the fixing belt 21 is driven and rotated accordingly. Upon start of energization to the heater 23, the fixing belt 21 is heated. As the temperature of the fixing belt 21 reaches a predetermined target temperature, a paper sheet P carrying an unfixed image is conveyed to the nip portion N between the fixing belt 21 and the pressure roller 22. As a result, a toner image on the paper sheet P is heated, pressed, and fixed to the paper sheet P. The paper sheet P is ejected from the nip portion N and conveyed to the sheet ejector 400.

Configuration of Heater

Figure 3:
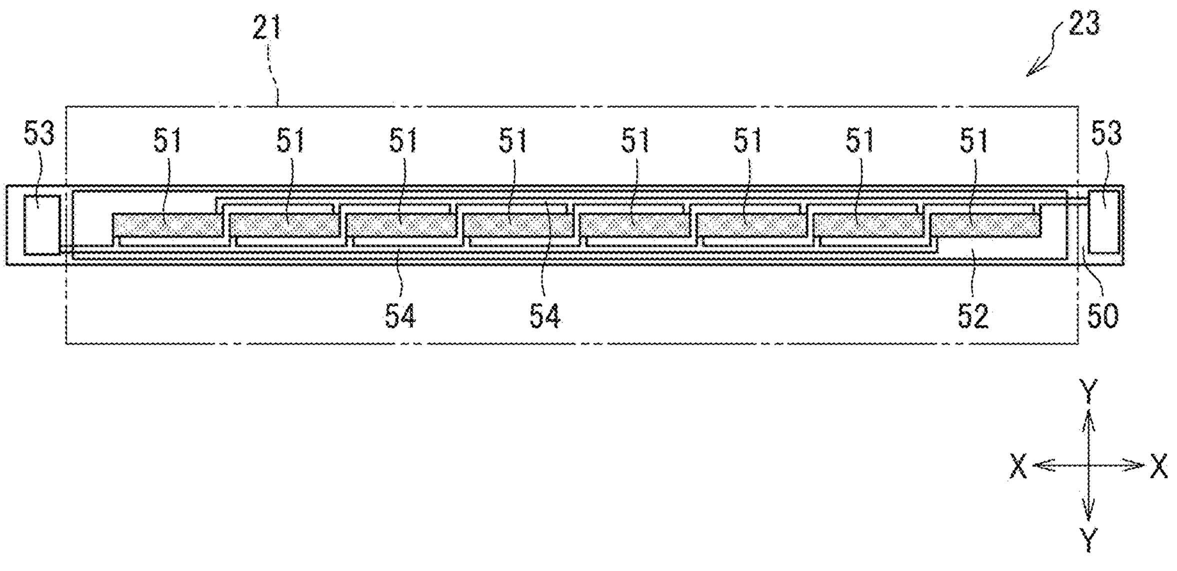
FIG. 3 is a plan view of a heater.

FIG. 3 is a plan view of the heater 23.

As illustrated in FIG. 3, the heater 23 is a planar or plate-shaped heater extending long in the X directions in the drawing. The heater 23 is disposed inside the fixing belt 21 to allow its longitudinal directions X to coincide with the longitudinal directions of the fixing belt 21. The "longitudinal directions of the fixing belt 21" referred in here means directions orthogonal to a rotation direction of the fixing belt 21 along the outer circumferential surface of the fixing belt 21. In addition to the base material 50, the resistive heat generators 51, and the insulating layer 52, the heater 23 includes electrodes 53 and power supply lines 54. The base material 50, the resistive heat generators 51, and the insulating layer 52 are elongated in the longitudinal direction X.

The plurality of resistive heat generators 51 is disposed at intervals in the longitudinal directions of the base material 50. A gap between each adjacent two of the resistive heat generators 51 may preferably be 0.2 mm or more, and may more preferably be 0.4 mm or more, from a viewpoint of ensuring insulation between the each adjacent two of the resistive heat generators 51. However, since, if the gap between each adjacent two of the resistive heat generators 51 is excessive, a decrease in temperature may easily occur in the gap, the gap may preferably be 5 mm or less, and may more preferably be 1 mm or less, from a viewpoint of suppressing unevenness in temperature in the longitudinal directions. The resistive heat generators 51 are respectively coupled to the pair of electrodes 53 via the power supply lines 54. In the example illustrated in FIG. 3, the pair of electrodes 53 is respectively provided at both ends in the longitudinal directions of the base material 50, and each of the resistive heat generators 51 is coupled in electrically parallel to each of the electrodes 53. Arrangement, numbers, shapes, and the like of the resistive heat generators 51, the electrodes 53, and the power supply lines 54 are not limited to the arrangement, the numbers, the shapes, and the like in the example illustrated in FIG. 3, and may be appropriately changed.

The electrodes 53 and the power supply lines 54 are provided on a surface of the base material 50, on which surface the resistive heat generators 51 are provided. The power supply lines 54 are covered with the insulating layer 52 similar or identically to the resistive heat generators 51 to ensure insulation and durability. For coupling of connectors serving as power supply members, respectively, the electrodes 53 are not covered with the insulating layer 52 but are exposed. When the connectors are respectively coupled to the electrodes 53, each of the resistive heat generators 51 and a power supply are electrically coupled to each other, achieving a state where it is possible to supply power from the power supply to each of the resistive heat generators 51.

Temperature Control Mechanism

Figure 4:
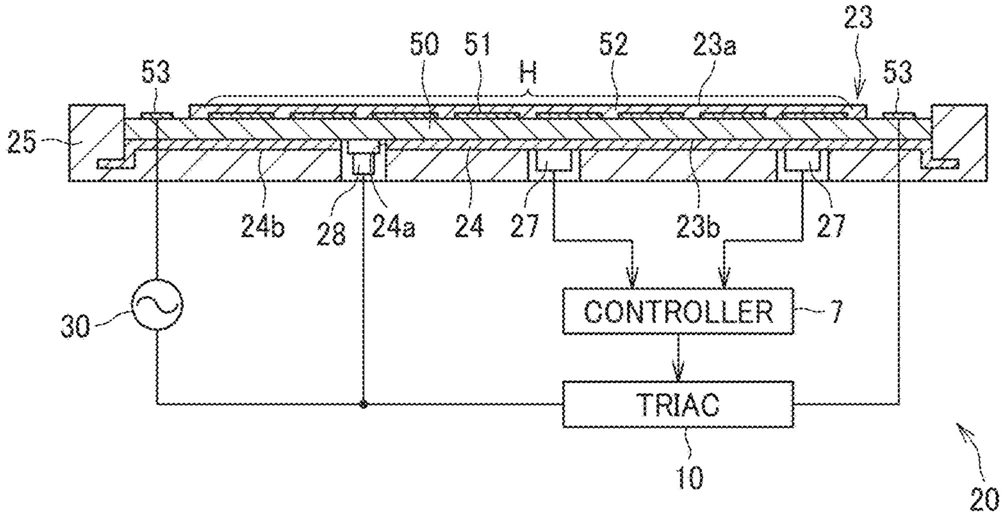
FIG. 4 is a block diagram of a temperature control mechanism for the heater.

FIG. 4 is a block diagram of a temperature control mechanism for the heater 23.

As illustrated in FIG. 4, the fixing device 20 includes the thermistors 27, a thermostat 28, a triac 10, and a controller 7 serving as a temperature control mechanism that controls the temperature of the heater 23.

The thermistors 27 are temperature sensors for temperature control provided to maintain the temperature of the heater 23 at a predetermined temperature. Different from the thermistors 27, the thermostat 28 is a temperature sensor for preventing an excessive increase in temperature, which is provided to prevent an abnormal increase in temperature in the heater 23. In the present embodiment, the thermistors 27 are respectively disposed at a center in the longitudinal directions and on one end side in the longitudinal directions of a heat generating region H on the heater 23, and the thermostat 28 is disposed on another end side in the longitudinal directions, which is opposite to the one end side in the longitudinal directions of the heat generating region H. Arrangement and numbers of the thermistors 27 and the thermostat 28 are not limited to the arrangement and the numbers in the example of FIG. 4, and may be appropriately changed.

Each of the thermistors 27 is in contact with the heat equalizing plate 24 and detects the temperature of the heater 23 via the heat equalizing plate 24. The thermostat 28 is in direct contact with the contact surface 23*a* (back surface) of the heater 23 via a hole 24*a* on the heat equalizing plate 24. As a result, it is possible to improve responsiveness of the thermostat 28 with respect to a change in temperature in the heater 23. When the thermostat 28 detects an abnormal increase in temperature in the heater 23, the thermostat 28 operates to cancel energization to the heater 23. However, similar to the thermistors 27, the thermostat 28 may be configured to be in contact with the heat equalizing plate 24.

The triac 10 is an energization controller that controls an energization duty from an alternating current (AC) power supply 30 to the heater 23 based on an instruction provided from the controller 7. The term "energization duty" refers to a ratio of an energization time to the heater 23 per control cycle. Specifically, the controller 7 is configured to include a microcomputer including a central processing unit (CPU), a read-only memory (ROM), a random-access memory (RAM), and an input/output (I/O) interface. As the controller 7 outputs a control signal for controlling the triac 10 based on a temperature detected by each of the thermistors 27, the triac 10 controls the energization duty based on the control signal, maintaining the temperature of the heater 23 at the predetermined target temperature.

Figure 5A:
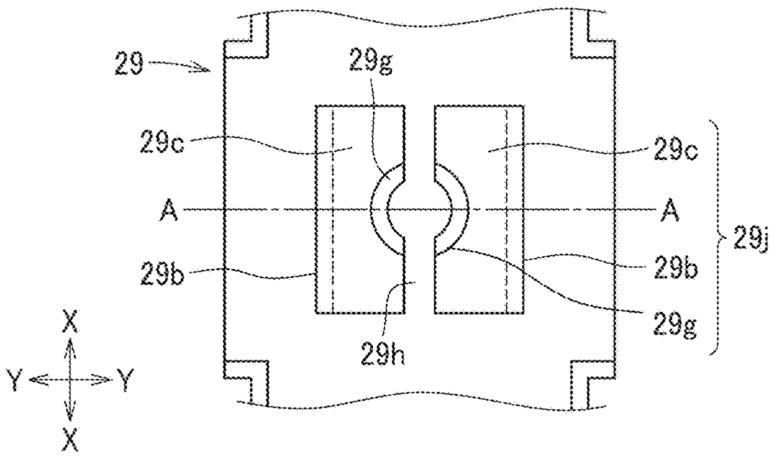

Next, a detailed configuration of the thermistor holder 29 will now be described herein with reference to FIGS. 5A to 5C. FIG. 5A is a plan view of the thermistor holder 29, in particular, a portion that holds the thermistor, FIG. 5B is a side view, and FIG. 5C is a cross-sectional view taken along a line A-A illustrated in FIG. 5A.

Figure 5B:
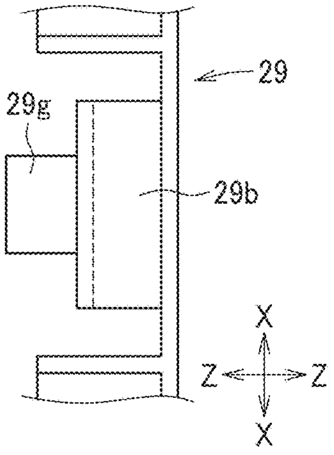
Figure 5C:
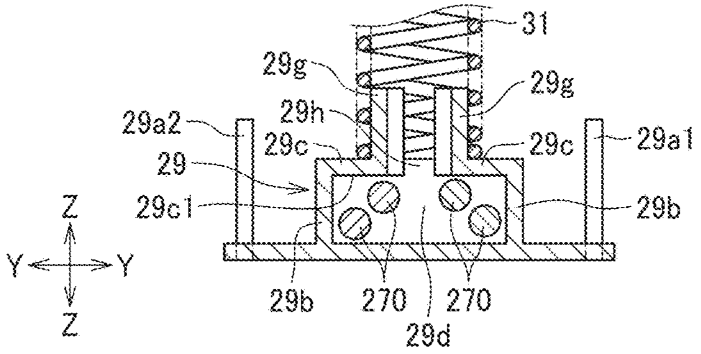

As illustrated in FIGS. 5A to 5C, the thermistor holder 29 includes a pair of supports 29*j*. The pair of supports 29*j* includes a pair of support portions 29*b* on both sides in the directions Y and rising in the directions Z, and a pair of supported portions 29*c* respectively supported by the support portions 29*b*, and the pair of supported portions 29*c* extends in the directions Y. One end in the directions Y of each of the supported portions 29*c* is supported by the support portions 29*b*. The pair of support portions 29*b* are vertical walls rising from floor 29*i*. The pair of supported portions 29*c* are ceiling extending from the pair of support portions 29*b* to form a wiring space 29*d*.

The support portions 29*b* rise from the floor 29*i* in the directions Z. The supported portions 29*c* extend in the directions Y. Thus, the support portions 29*b* have a certain length in the directions Z, and the supported portions 29*c* have a certain length in the directions Y. However, the support portions 29*b* may rise from the floor 29*i* in a direction inclined relative to the direction Z. The supported portions 29*c* extend in a direction inclined relative to the directions Y.

A slit 29*h* for arranging harnesses 270 (also referred to as electric wire(s)) in the wiring space 29*d* in the thermistor holder 29 is provided between the pair of supported portions 29*c*. The slit 29*h* has a linear shape when viewed in one of the directions Z, is provided to extend in the longitudinal directions, and is provided from one end to another end in the longitudinal directions of the thermistor holder 29. A pair of attachments 29*g* is provided on both sides with the slit 29*h* interposed. In other words, a continuous gap is provided between one side portions in the longitudinal directions of the pair of supported portions 29*c*, between the pair of attachments 29*g*, and between other side portions in the longitudinal directions of the pair of supported portions 29*c*, and this continuous gap is referred to as the slit 29*h*. A fact that the slit 29*h* is provided to extend in the longitudinal directions does not necessarily indicate that the slit 29*h* is provided in directions parallel to the longitudinal directions, but indicates that extending directions of the slit 29*h* each have a component in the longitudinal directions when viewed in one of the directions Z.

As illustrated in FIG. 5C, a biasing spring 31 is attached to a position outside the pair of attachments 29*g*. The thermistor holder 29 has the wiring space 29*d* that is surrounded by the pair of support portions 29*b* and the pair of supported portions 29*c* and communicates with the slit 29*h*. In other words, the wiring space 29*d* is provided inside the thermistor holder 29, is a portion surrounded from the both sides in the Y directions and the Z directions, and communicates with outside of the thermistor holder 29 via the both sides in the X directions or the slit 29*h*. The harnesses 270 are disposed in the wiring space 29*d* via the slit 29*h*. The biasing spring 31 is a coil spring. However, it is not necessary that the wiring space 29*d* be necessarily surrounded in a circumferential shape, and there may be a portion that is not surrounded by a portion facing in the directions Y or the directions Z, other than the slit 29*h*. The thermistor holder 29 may be referred to simply as a "holder".

Figure 6:
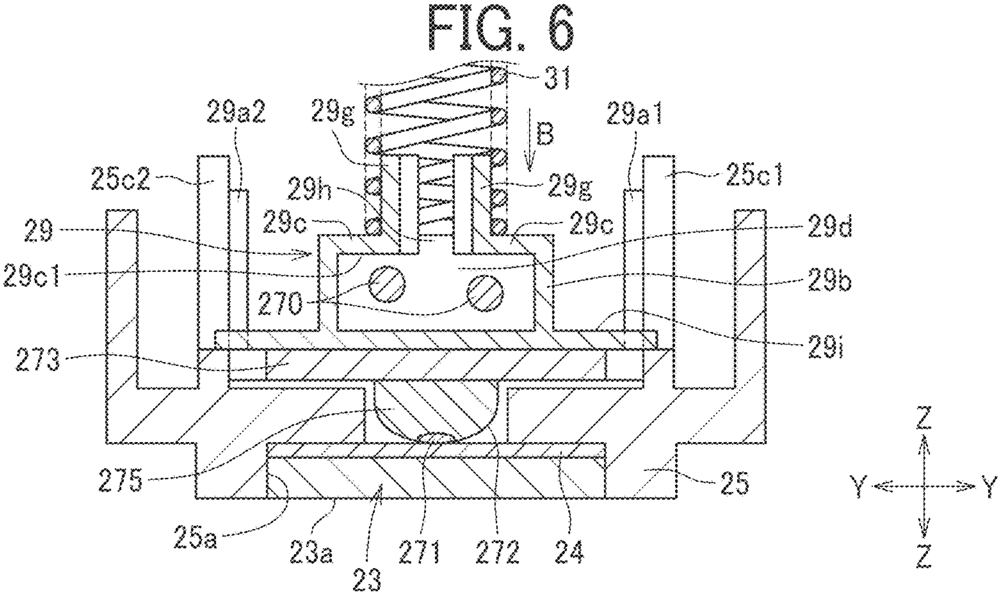
FIG. 6 is a cross-sectional view illustrating the thermistor, the thermistor holder, and a heater holder.
Figure 9:
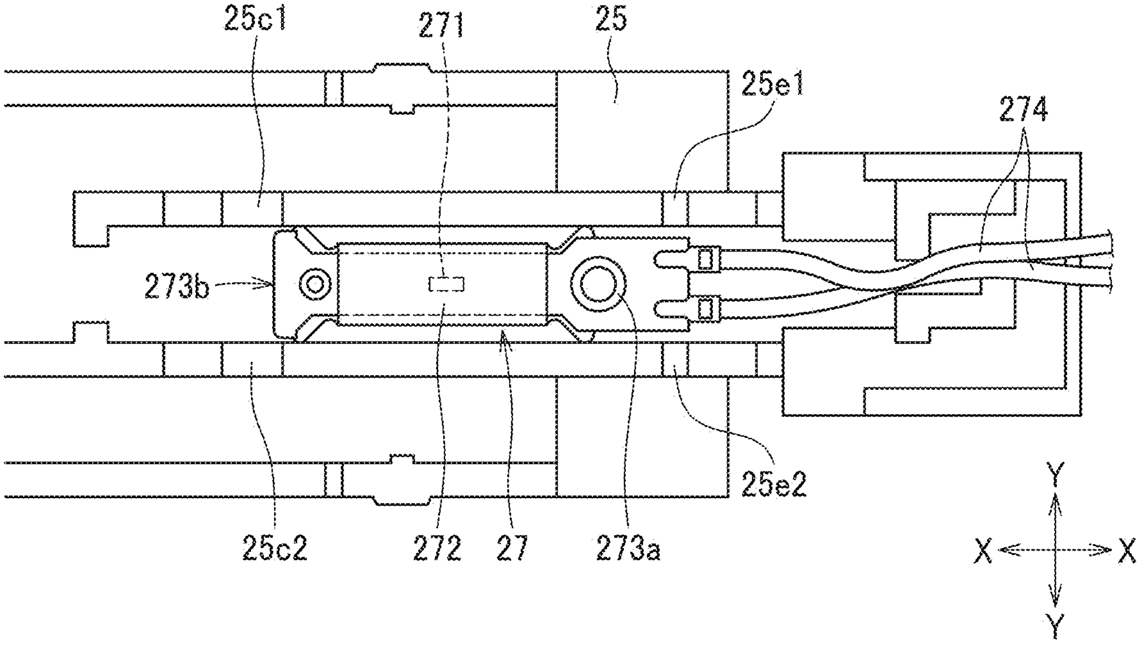
FIG. 9 is a rear view of a state where the thermistor is attached to the heater holder.

FIG. 6 is a cross-sectional view corresponding to the cross section of FIG. 5C illustrating the heater holder 25, the thermistor 27, the thermistor holder 29, and the like, and is a cross-sectional view as viewed in a right direction in FIG. 9.

As illustrated in FIG. 6, the thermistor holder 29 is assembled to the heater holder 25 and positioned in the heater holder 25. The thermistor holder 29 holds the thermistor 27 from a side opposite to the heater 23 (upper side in FIG. 6). The thermistor holder 29 is biased toward the heater 23 by the biasing spring 31 serving as a biasing member. With this biasing force, the thermistor holder 29 presses (biases) the thermistor 27 in a direction of an arrow B, pressing a heat-sensitive element 271 of the thermistor 27 against the heat equalizing plate 24 via an insulating sheet 272. The heat equalizing plate 24 is a detection-target member that is caused to abut the thermistor 27 for detecting its temperature. In other words, the thermistor 27 abuts the heat equalizing plate 24 to detect its temperature, making it possible to indirectly detect the temperature of the heater 23 or the fixing belt. However, the heater 23 or the fixing belt may be a detection-target member that is caused to directly contact the thermistor 27 to detect the temperature of the heater or the fixing belt.

The heat-sensitive element 271 is attached to a base 273 via an elastic body 275. The elastic body 275 has a shape having a curved surface protruding toward the heater 23, and the heat-sensitive element 271 is held at a top of the curved surface, that is, at a portion of the elastic body 275, which protrudes most toward the heater 23. As a result, it is possible to allow the heat-sensitive element 271 to appropriately contact the heat equalizing plate 24.

Figure 7A:
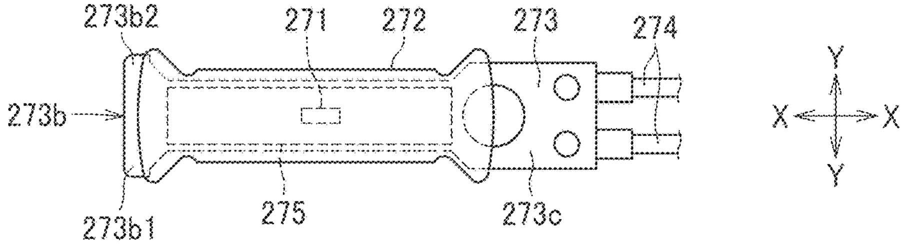
Figure 7B:
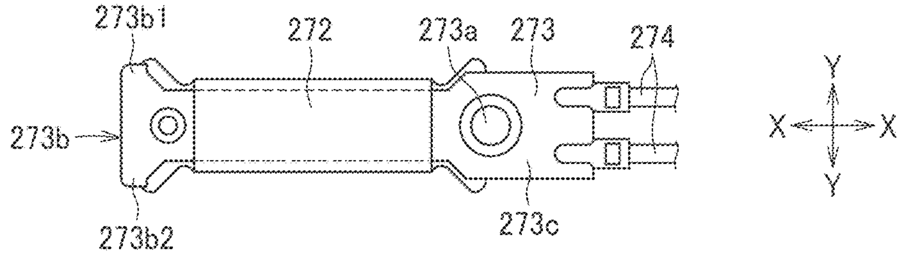
Figure 7C:
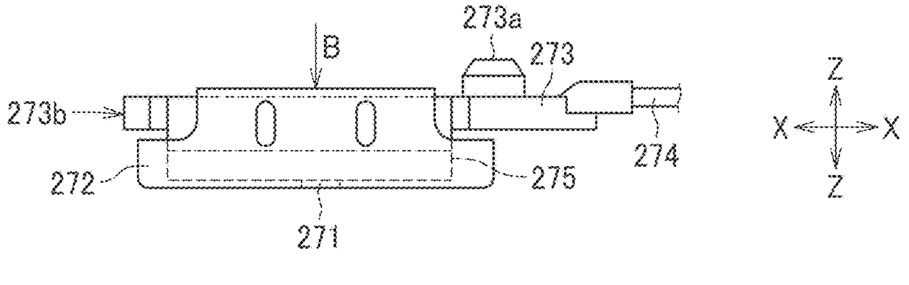

FIGS. 7A to 7C are views illustrating the thermistor 27, in which FIG. 7A is a plan view, FIG. 7B is a rear view, and FIG. 7C is a side view.

As illustrated in FIG. 7A, the thermistor 27 includes the heat-sensitive element 271 serving as a temperature detector, the insulating sheet 272 serving as an insulator, the base 273, harnesses 274, the elastic body 275, and the like.

The base 273 holds the heat-sensitive element 271 via the elastic body 275. A portion of the base 273, at which the heat-sensitive element 271 is held, is wound with the insulating sheet 272, and the insulating sheet 272 covers a surface of the heat-sensitive element 271. The elastic body 275 is a piece of sponge.

As illustrated in FIG. 7B, the base 273 has a positioning tube 273*a*. The positioning tube 273*a* has a tube shape having a hole extending in the Z directions on its inner side. An end 273*b* in the longitudinal directions of the thermistor 27 has a substantially T shape having, on both sides in the Y directions, a first protrusion 273*b*1 and a second protrusion 273*b*2 respectively protruding outward in the Y directions. The harnesses 274 are coupled to another end 273*c* of the base 273. The harnesses 274 are fixed to the base 273 through soldering, for example. The harnesses 270 illustrated in FIGS. 5 and 7 are, for example, harnesses of a thermistor different from the thermistor 27 held by the thermistor holder 29 illustrated in FIG. 10.

As illustrated in FIG. 7C, the base 273 is pressed by the biasing force of the biasing spring in the direction of the arrow B via the thermistor holder. As a result, the heat-sensitive element 271 is pressed against the heat equalizing plate via the insulating sheet 272.

Figure 8:
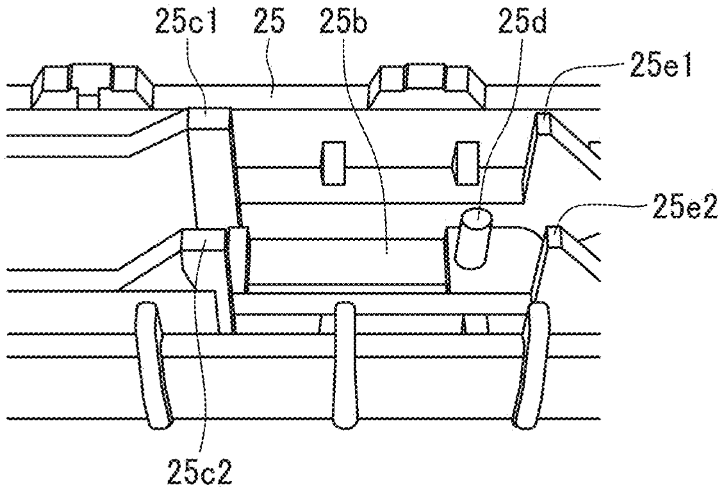
FIG. 8 is a perspective view illustrating a back surface side of the heater holder.

FIG. 8 is a perspective view illustrating the back surface of the heater holder 25, that is, a surface to which the thermistor 27 is attached.

As illustrated in FIG. 8, the heater holder 25 includes a pair of positioning ribs 25*c*1 and 25*c*2 and a positioning pin 25*d*. The positioning ribs 25*c*1 and 25*c*2 and the positioning pin 25*d* extend toward the back surface (upper side in FIG. 6) in one of the directions Z.

FIG. 9 is a view of a state where the thermistor 27 is attached on a back surface side of the heater holder 25.

As illustrated in FIG. 9, the end 273*b* of the base 273 of the thermistor 27 is inserted and fitted between the pair of positioning ribs 25*c*1 and 25*c*2 provided on the heater holder 25. The positioning pin 25*d* (see FIG. 8) is inserted into the hole inside the positioning tube 273*a* of the thermistor 27, and the thermistor 27 is positioned in the heater holder 25. The thermistor 27 is positioned with some play with respect to the heater holder 25. As a result, the thermistor 27 is able to move, when pressed by the thermistor holder, in a direction toward the heat equalizing plate, allowing the heat-sensitive element of the thermistor 27 to appropriately contact the heat equalizing plate.

Next, a configuration of the thermistor holder 29 will now be described herein with reference to a perspective view of FIG. 10.

Figure 10:
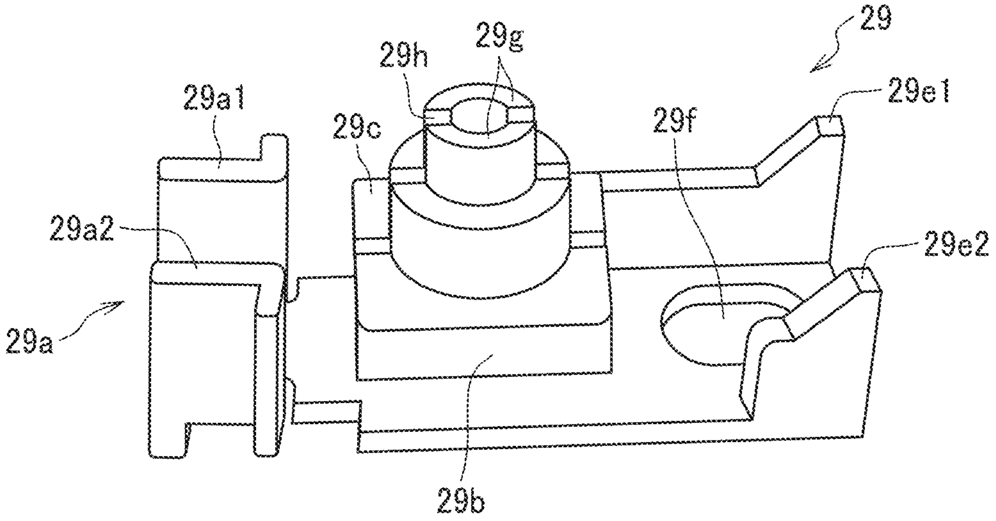
FIG. 10 is a perspective view of the thermistor holder.

As illustrated in FIG. 10, the thermistor holder 29 is provided with, at its end 29*a*, a pair of abutting ribs 29*a*1 and 29*a*2 protruding in the thickness directions. The pair of abutting ribs 29*a*1 and 29*a*2 is disposed at an interval in the lateral directions.

Figure 11:
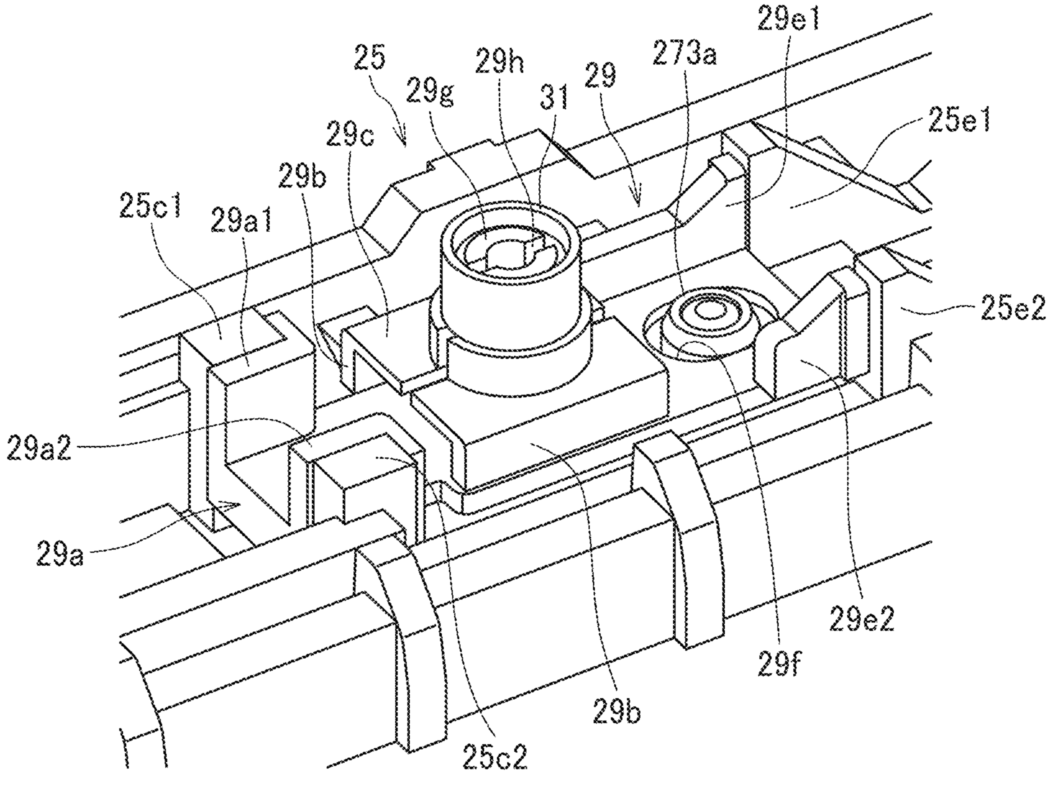
FIG. 11 is a perspective view of a state where the thermistor holder is attached to the heater holder.
Figure 12:
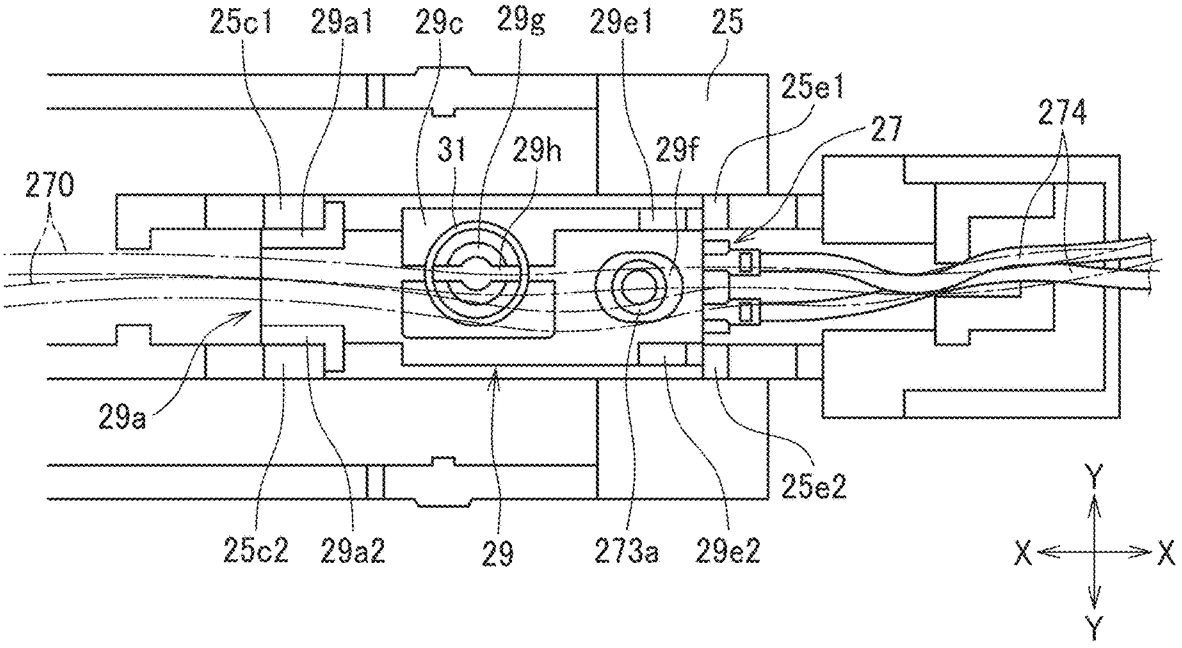
FIG. 12 is a rear view of the state where the thermistor holder is attached to the heater holder.

FIG. 11 is a perspective view of the back surface side when the thermistor holder 29 is attached to the heater holder 25, and FIG. 12 is its rear view. In FIGS. 11 and 12, the biasing spring 31 is illustrated as a cylindrical member for purposes of convenience.

As illustrated in FIGS. 11 and 12, the thermistor holder 29 has, at its end 29*a*, the pair of abutting ribs 29*a*1 and 29*a*2 protruding in the thickness directions. The pair of abutting ribs 29*a*1 and 29*a*2 is disposed at an interval in the lateral directions. The thermistor holder 29 has, on its another end side, a pair of abutting ribs 29*e*1 and 29*e*2 protruding in the thickness directions. The pair of abutting ribs 29*e*1 and 29*e*2 is disposed at an interval in the lateral directions.

The end 29*a* in the longitudinal directions, which serves as a fitting of the thermistor holder 29, is fitted between the pair of positioning ribs 25*c*1 and 25*c*2 of the heater holder 25. At this time, the abutting rib 29*a*1 of the thermistor holder 29 abuts the positioning rib 25*c*1 of the heater holder 25, and the abutting rib 29*a*2 abuts the positioning rib 25*c*2. It is not necessary that the abutting ribs 29*a*1 and 29*a*2 protruding in the directions Z be necessarily provided in the thermistor holder 29. Providing the abutting ribs 29*a*1 and 29*a*2 to be respectively adjacent to the positioning ribs 25*c*1 and 25*c*2 preferably makes it possible to further suppress inclination of the thermistor holder 29 with respect to the heater holder 25. The abutting ribs 29*a*1 and 29*a*2 each have a substantially L shape having a portion extending in the directions X and a portion extending in the directions Y, and each of the abutting ribs 29*a*1 and 29*a*2 may be provided to have only the portion extending in the directions X, which abuts each of the positioning ribs 25*c*1 and 25*c*2 in the Y directions. FIG. 6 illustrates, for purposes of convenience, only the portions respectively extending in the directions X of the abutting ribs 29*a*1 and 29*a*2.

The positioning tube 273*a* of the thermistor 27 is inserted into a positioning hole 29*f* on the thermistor holder 29, and the positioning tube 273*a* is positioned with some play in the positioning hole 29*f*. That is, the thermistor 27 is positioned with respect to the thermistor holder 29. As described above, the positioning hole 29*f* and the positioning tube 273*a* are positioners for the thermistor holder 29 and the thermistor 27.

The harnesses 270 are routed in the longitudinal directions X and are allowed to pass through the wiring space 29*d* below the support portion 29*b* of the thermistor holder 29 in the X directions along the routing. The harnesses 270 pass through the thermistor holder 29 in the X directions. The harnesses 270 passing through the wiring space 29*d* in the X directions is not limited to the harnesses 270 wired strictly parallel to the X directions. The harnesses 270 may be provided in a meandering manner as illustrated in FIG. 12.

As illustrated in FIG. 6, when the thermistor holder or the like of the fixing device is to be assembled, the thermistor holder 29 is assembled to the heater holder 25, and the harnesses 270 are wired from the slit 29*h* on the thermistor holder 29 into the wiring space 29*d*. The biasing spring 31 is attached to the pair of attachments 29*g* of the thermistor holder 29. As a result, the biasing spring 31 is disposed above the slit 29*h*, preventing the harnesses 270 from coming out of the slit 29*h*. The supported portions 29*c* are portions where the pair of attachments 29*g* are respectively provided, and are biased in the direction of the arrow B by the biasing spring 31 attached to the pair of attachments 29*g*.

In this configuration, applying the configuration where the harnesses 270 are accommodated (wired) in the wiring space 29*d* from the slit 29*h* makes it possible to provide the support portions 29*b* that respectively support the supported portions 29*c* and the pair of attachments 29*g* on the both sides in the directions Y. As a result, when the thermistor holder 29 is biased downward in FIG. 6 by the biasing spring 31, the support portions 29*b* are able to support the biasing force on the both sides in the directions Y to allow a load to be dispersed, making it possible to suppress inclination of the thermistor holder 29 with respect to the heater holder 25. For example, in a configuration in which the harnesses 270 is wired in the wiring space 29*d* from a side in the directions Y, the support portion 29*b* is difficult to be provided on the side from which the harnesses 270 are to be wired.

Only the support portion 29*b* on another side in the directions Y supports the supported portion 29*c* and the pair of attachments 29*g*. In the present embodiment, as compared with such a configuration as described above, it is possible to suppress inclination of the thermistor holder 29, making it possible to correctly maintain the thermistor holder in posture. As a result, the thermistor holder 29 receives the biasing force of the biasing spring 31 to bias the thermistor 27 downward in FIG. 7, making it possible to allow the thermistor 27 to appropriately contact the heat equalizing plate 24. The thermistors 27 are able to appropriately detect the temperature of the heat equalizing plate 24 serving as a detection-target member.

In particular, in the present embodiment, as described above, the heat-sensitive element 271 is held at the top of the elastic body 275, which is protruded toward the heat equalizing plate 24, and the heat-sensitive element 271 tends to easily incline in posture when the thermistor holder 29 is inclined. Adopting the present configuration to suppress inclination of the thermistor holder 29 is preferable.

Figure 13:
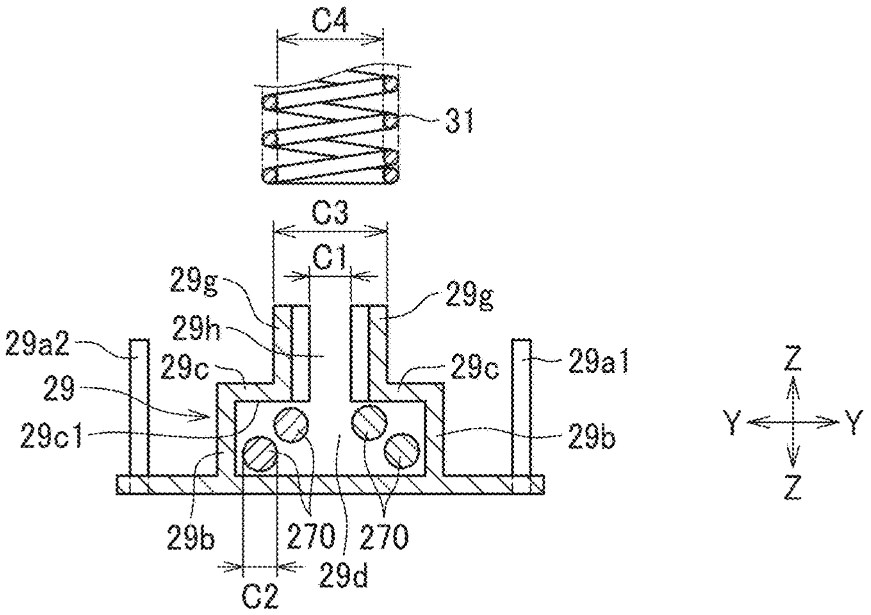
FIG. 13 is a cross-sectional view illustrating the thermistor holder and a biasing spring.

It is possible to increase a width C1 in the directions Y to be provided for the slit 29*h* illustrated in FIG. 13 larger than a thickness (diameter) C2 of each of the harnesses 270. As a result, it is possible to allow the harnesses 270 to each easily pass through the slit 29*h*, improving ease of assembly. It is otherwise possible to decrease the width C1 to be provided smaller than the thickness C2 of each of the harnesses 270. In this case, the thermistor holder 29 is deformed to widen the width C1 of the slit 29*h*, and each of the harnesses 270 is allowed to pass through the slit 29*h*. With such a configuration, it is possible to suppress, after wired in the wiring space 29*d*, coming out of the harnesses 270 from the slit 29*h* to outside. The above description regarding the size of the width C1 also applies to the slits 29*h* respectively having shapes described later. FIG. 13 illustrates the thermistor holder 29 before the biasing spring 31 is attached, and the width C1, a diameter C3, and the like refer to a width, a diameter, and the like before the biasing spring 31 is attached.

It is possible to increase the diameter C3 of outer circumferential surfaces of the pair of attachments 29*g*, to which the biasing spring 31 is to be attached, larger than a diameter C4 of an inner circumferential surface of the biasing spring 31 before assembly. In this case, attaching the biasing spring 31 to the pair of attachments 29*g* allows a force in its inner diameter direction acts on the pair of attachments 29*g* from the biasing spring 31, making it possible to prevent the biasing spring 31 from falling off from the pair of attachments 29*g*.

Combining the configuration in which the width C1 to be provided is increased to be larger than the diameter C2 and the configuration in which the diameter C3 to be provided is increased to be larger than the diameter C4 as illustrated in FIG. 13 makes it possible to achieve a configuration in which the width C1 becomes larger than the diameter C2 when the harnesses 270 are each allowed to pass through the slit 29*h*, and a width corresponding to the width C1 of the slit 29*h* becomes narrowed and smaller than the diameter C2 by attaching the biasing spring 31 to the pair of attachments 29*g*. As a result, it is possible to improve ease of working when the harnesses 270 are each allowed to pass through the slit 29*h*, and to suppress coming off of the harnesses 270 from the slit 29*h*. However, it is not necessary that these configurations be necessarily combined with each other, and, even when these configurations are combined with each other, such a configuration may be applied that a width corresponding to the width C1 of the slit 29*h* after the biasing spring 31 is attached be larger than the diameter C2.

Next, modifications of the slit 29*h* will now be sequentially described herein.

Figure 14:
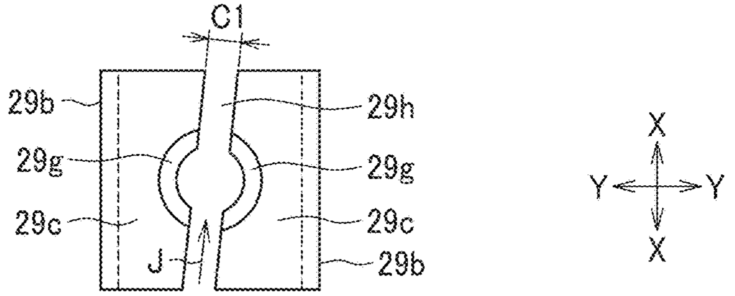
FIG. 14 is a plan view illustrating a modification of a slit.

The slit 29*h* illustrated in FIG. 14 has a linear shape when viewed in one of the directions Z, and its extending directions J are inclined with respect to the longitudinal directions representing directions in which the harnesses are wired. As a result, it is possible to suppress coming off of the harnesses from the slit 29*h*. The extending directions of the slit 29*h* refer to directions of a line coupling center positions in the width directions when the slit 29*h* is viewed from one of the directions Z. Thus, the slit 29*h* may extend in a fourth direction J inclined relative to the first direction (longitudinal direction X).

Figure 15:
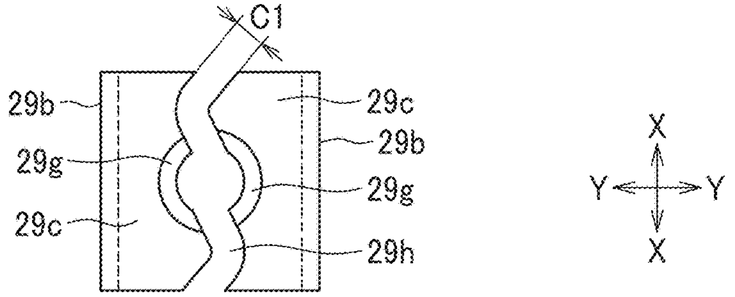
FIG. 15 is a plan view illustrating another modification of the slit.

As illustrated in FIG. 15, the slit 29*h* may be provided in a meandering manner. As a result, it is possible to suppress coming off of the harnesses from the slit 29*h*. Thus, the slit 29*h* may have a meandering slit.

Although the present embodiment has been described above, the present embodiment is not limited to the embodiment described above, and various modifications can be made without departing from the gist of the present embodiment.

Figure 16:
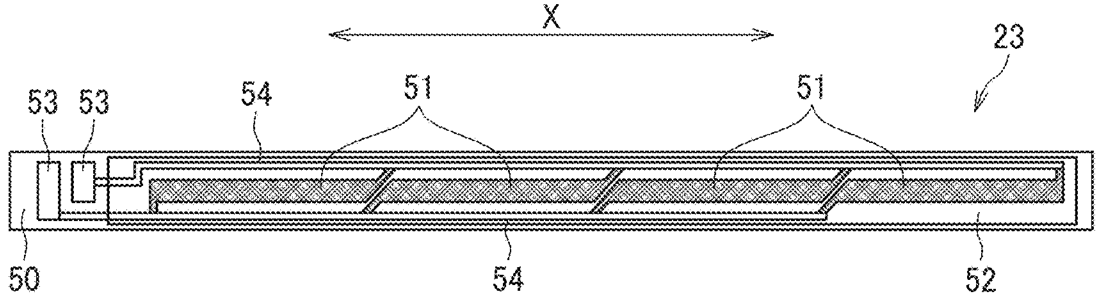
FIG. 16 is a view illustrating a modification of resistive heat generators.
Figure 17:
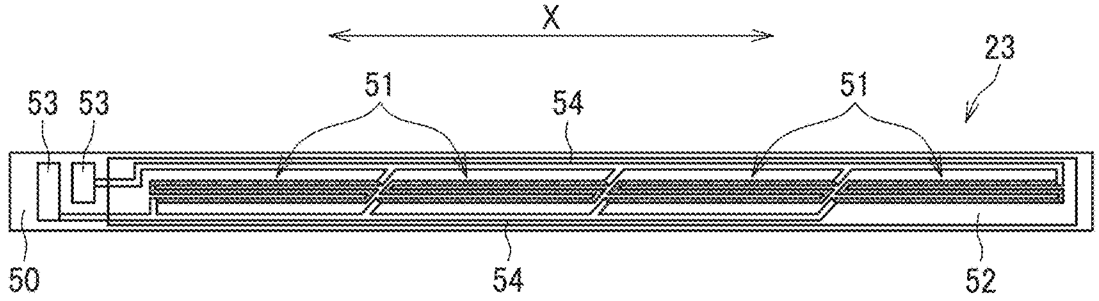
FIG. 17 is a view illustrating another modification of the resistive heat generators.

The resistive heat generator 51 is not limited to have an oblong shape as illustrated in FIG. 3, and may have a parallelogram as illustrated in FIG. 16, a folded shape as illustrated in FIG. 17, or the like. As illustrated in FIG. 16 or 17, the pair of electrodes 53 may be both provided at one end of the base material 50 in the longitudinal directions X of the heater 23.

Figure 18:
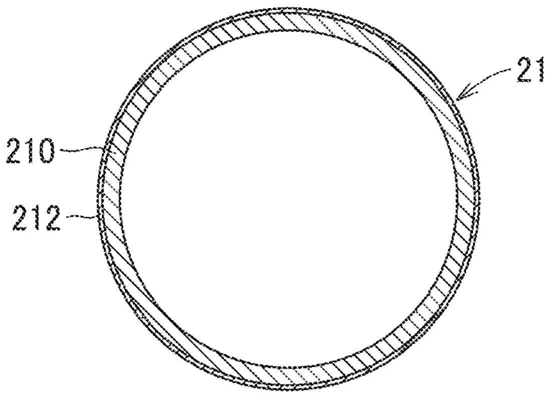
FIG. 18 is a cross-sectional view of a fixing belt having no elastic layer.

The present embodiment is also preferable for a configuration including the fixing belt 21 having no elastic layer as illustrated in FIG. 18. Since the fixing belt 21 illustrated in FIG. 18 does not have an elastic layer such as a rubber layer between a surface layer (release layer) 212 and a base material 210, its heat insulating property is low and a rate of thermal conductivity from the heater to the surface (outer circumferential surface) of the fixing belt is high, compared with the fixing belt having an elastic layer. However, an increase in temperature in the fixing belt 21 in a non-sheet-passing-through region tends to be significant. It is important to allow the thermistors to appropriately detect the temperature to appropriately control the temperature of the fixing belt 21, and applying the heater holder 25, the thermistor 27, and the thermistor holder 29 according to the embodiment described above may be preferable.

Figure 19:
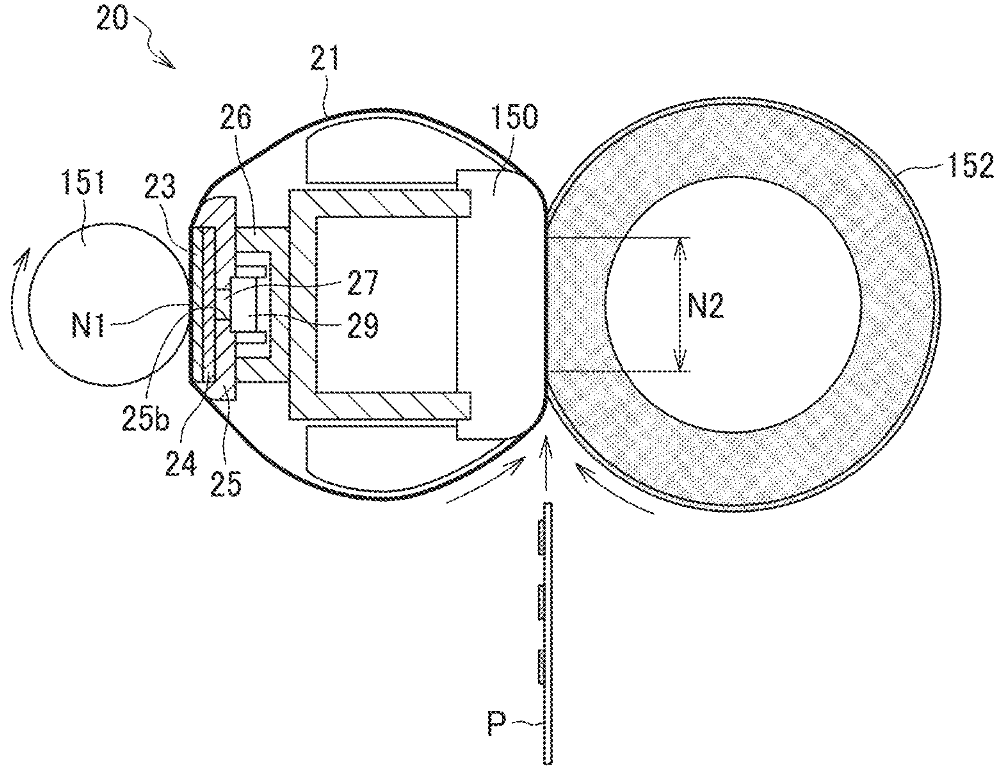
FIG. 19 is a view illustrating a configuration of another fixing device.
Figure 20:
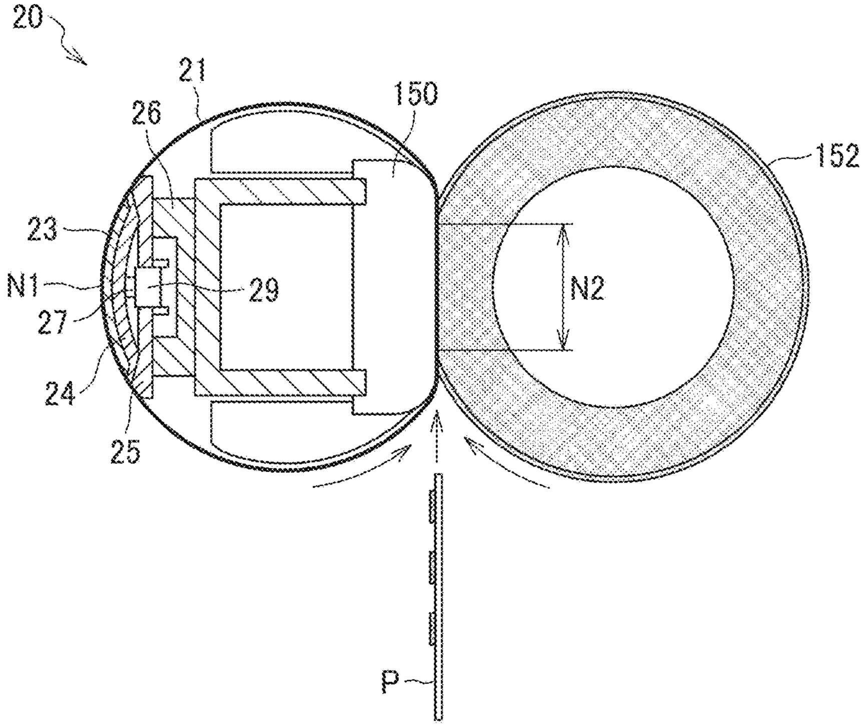
FIG. 20 is a view illustrating a configuration of still another fixing device.
Figure 21:
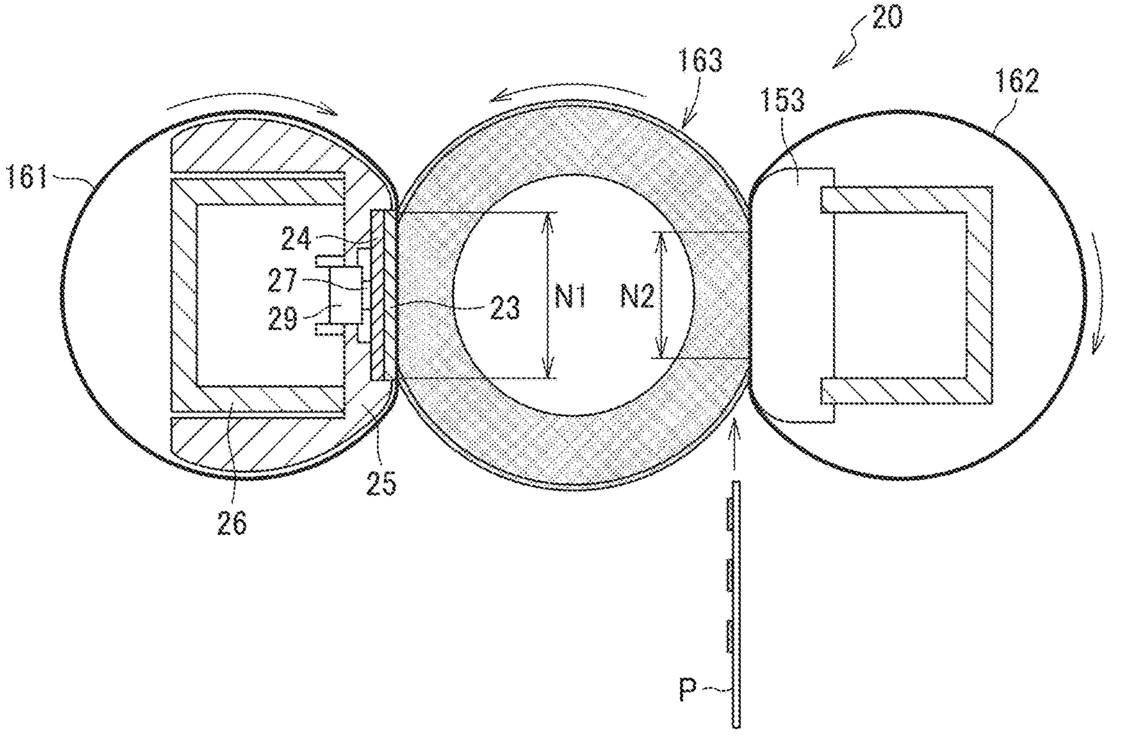
FIG. 21 is a view illustrating a configuration of still another fixing device.

In addition to the fixing device 20 illustrated in FIG. 2, the present embodiment is also applicable to fixing devices respectively having configurations illustrated in FIGS. 19 to 21. The fixing devices respectively having the configurations illustrated in FIGS. 19 to 21 will now be described herein. In FIGS. 19 to 21, identical or corresponding portions of components to the portions of the components of the fixing device 20 illustrated in FIG. 2 are applied with identical reference numerals to the reference numerals illustrated in FIG. 2, and their descriptions are omitted.

In the fixing device 20 illustrated in FIG. 19, a nip portion N1 for heating and a nip portion N2 for fixing are formed at different positions. Specifically, two large and small pressure rollers 151 and 152 are both respectively in contact with the fixing belt 21 from sides opposite to each other to form the nip portion N1 for heating and the nip portion N2 for fixing. That is, the pressure roller 151 on a left side in FIG. 19 is in contact with the heater 23 via the fixing belt 21 to form the nip portion N1 for heating, and the pressure roller 152 on a right side in FIG. 19 is in contact with a nip forming member 150 via the fixing belt 21 to form the nip portion N2 for fixing. In this case, as the heater 23 generates heat, the fixing belt 21 is heated in the nip portion N1 for heating. As a paper sheet P enters the nip portion N2 for fixing, an unfixed image on the paper sheet P is heated and pressed, and the image is fixed to the paper sheet P.

The example illustrated in FIG. 20 is an example where the pressure roller 151 on the left side in FIG. 19 is omitted, and the heater 23 is formed in an arc shape in accordance with a curvature of the fixing belt 21. Others are identical in configuration to the fixing device 20 illustrated in FIG. 19. In this case, since the heater 23 is formed in an arc shape, a long contact region is secured between the fixing belt 21 and the heater 23 in a belt rotation direction, efficiently heating the fixing belt 21.

The example illustrated in FIG. 21 is an example where a pair of belts 161 and 162 is arranged on both sides of a roller 163 at a center. In this case, the belt 161 on the left side in FIG. 21 is pinched between the heater 23 disposed inside the belt and the roller 163 at the center to form the nip portion N1 for heating. The belt 162 on the right side in FIG. 21 is pinched between a nip forming member 153 disposed inside the belt and the roller 163 at the center to form the nip portion N2 for fixing. In this case, as the heater 23 generates heat, the roller 163 at the center is heated at the nip portion N1 for heating. As a paper sheet P enters the nip portion N2 for fixing, an unfixed image on the paper sheet P is heated and pressed, and the image is fixed to the paper sheet P.

It is also possible to apply the configurations of the heater holder 25, the thermistor 27, and the thermistor holder 29 according to the embodiment described above to the fixing devices illustrated in FIGS. 19 to 21. As a result, it is possible to suppress inclination of the thermistor holder 29, making it possible to maintain high detection accuracy of the thermistor 27.

Figure 22:
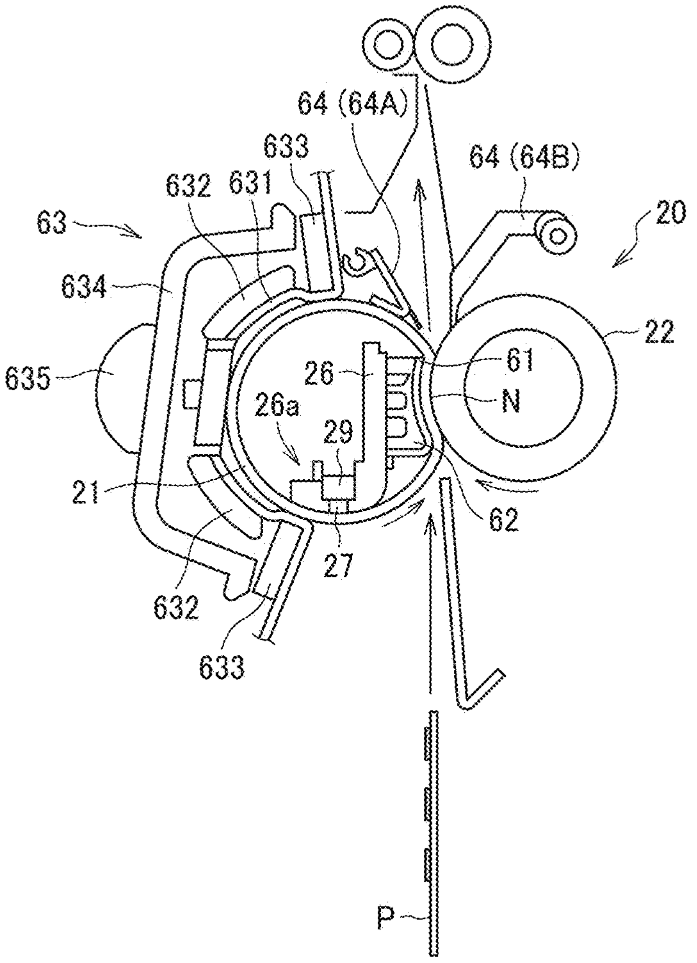
FIG. 22 is a view illustrating a configuration of still another fixing device.

The fixing device 20 illustrated in FIG. 22 includes an electromagnetic induction heating (IH) heater 63 serving as a heater for the fixing belt 21. In addition to the IH heater 63, the fixing device 20 includes the fixing belt 21, the pressure roller 22, the stay 26, the thermistor holder 29, a nip forming member 62, a sliding sheet 61, the thermistor 27, a separation plate 64A and a separation claw 64B serving as a separation member 64, and the like.

The IH heater 63 is disposed outside the fixing belt 21 and is fixed to a main body of the image forming apparatus. The IH heater 63 includes a coil 632, cores 633, 634, and 635, and a coil holder 631. The coil holder 631 holds the coil 632. As power is supplied to the coil 632, a magnetic field is formed around the coil 632, and an eddy current is generated in the metal belt base material of the fixing belt 21. As the eddy current is generated, Joule heat is generated by electric resistance of the belt base material, causing the fixing belt 21 to generate heat. The cores 633, 634, and 635 each include a ferromagnetic material, and forms a magnetic path through which the magnetic field (magnetic flux) generated from the coil 632 passes.

The thermistor 27 is in contact with the inner circumferential surface of the fixing belt 21 and detects the temperature of the fixing belt 21.

The nip forming member 62 is in contact with the pressure roller 22 via the fixing belt 21 to form the fixing nip N between the fixing belt 21 and the pressure roller 22. The sliding sheet 61 containing a lubricant is provided between the fixing belt 21 and the nip forming member 62. As the sliding sheet 61 and the lubricant are present in an interposed manner between the fixing belt 21 and the nip forming member 62, sliding resistance between the fixing belt 21 and the nip forming member 62 is reduced.

The stay 26 is a holder that holds the thermistor 27 and the thermistor holder 29 in addition to the nip forming member 62. The stay 26 includes a holder **26*a* that holds the thermistor holder 29 and the thermistor 27**.

It is possible to apply the thermistor 27 and the thermistor holder 29 according to the embodiment described above in the fixing device illustrated in FIG. 22, and it is possible to apply a portion (see FIG. 8) for holding the thermistor holder 29 of the heater holder described above to the holder **26*a* of the stay 26. As a result, it is possible to suppress inclination of the thermistor holder 29, making it possible to maintain high detection accuracy of the thermistor 27. However, the example differs from the embodiment described above in that the thermistor 27 abuts and detects the temperature of the inner circumferential surface of the fixing belt 21 via the stay 26**.

Figure 23:
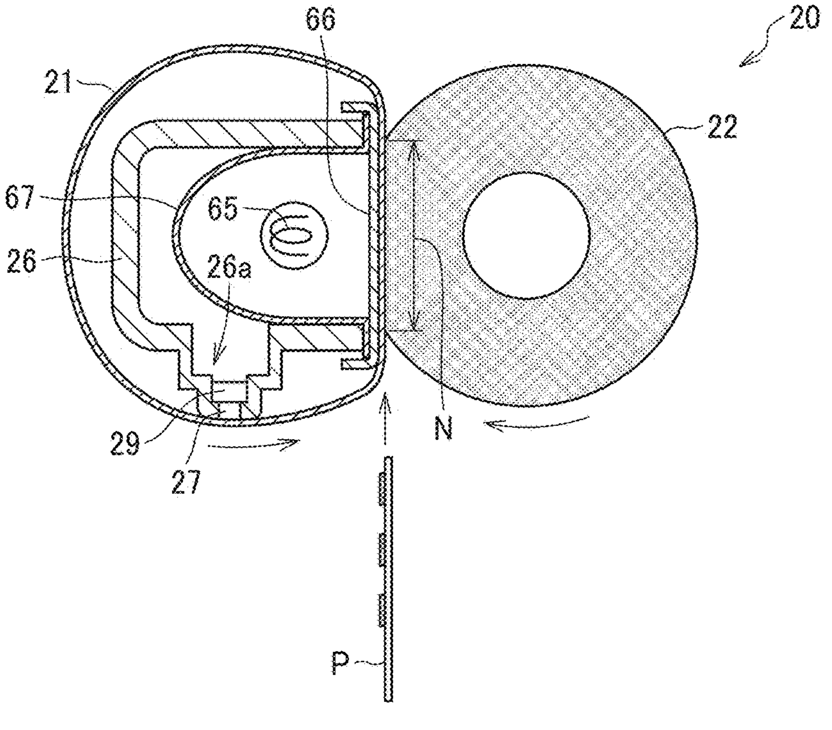
FIG. 23 is a view illustrating a configuration of still another fixing device.

The fixing device 20 illustrated in FIG. 23 includes a halogen heater 65 serving as a heater for the fixing belt 21. In addition to the halogen heater 65, the fixing device 20 includes the fixing belt 21, the pressure roller 22, the stay 26, a nip forming member 66, a reflecting member 67, the thermistor 27, the thermistor holder 29, and the like.

The nip forming member 66 is in contact with the pressure roller 22 via the fixing belt 21 to form the fixing nip N between the fixing belt 21 and the pressure roller 22. In this case, since the halogen heater 65 is disposed to face the nip forming member 66 inside the fixing belt 21, the nip forming member 66 is irradiated with infrared light emitted from the halogen heater 65. As a result, the nip forming member 66 is heated, and the heat of the nip forming member 66 is transferred to the fixing belt 21 at the position of the nip portion N to heat the fixing belt 21. The nip forming member 66 may preferably include a material that is higher in rate of thermal conductivity than the stay 26 to allow heat to be efficiently transferred to the fixing belt 21. The material of the nip forming member 66 is, for example, copper or aluminum.

Some of the infrared light emitted from the halogen heater 65 is reflected to the nip forming member 66 by the reflecting member 67 disposed inside the fixing belt 21. As a result, the nip forming member 66 is effectively heated. Since the reflecting member 67 is present in an interposed manner between the stay 26 and the halogen heater 65, irradiation of infrared rays and transfer of heat from the halogen heater 65 to the stay 26 are suppressed, also obtaining an energy saving effect.

The thermistor 27 is in contact with the inner circumferential surface of the fixing belt 21 and detects the temperature of the fixing belt 21.

The stay 26 is a holder that holds the thermistor 27 and the thermistor holder 29 in addition to the nip forming member 66 and the reflecting member 67. The stay 26 includes the holder **26*a* that holds the thermistor holder 29 and the thermistor 27**.

EMBODIMENTS

It is possible to apply the thermistor 27 and the thermistor holder 29 described above in the fixing device illustrated in FIG. 23 described above, and it is possible to apply a portion (see FIG. 8) for holding the thermistor holder 29 of the heater holder described above to the holder **26*a* of the stay 26. As a result, it is possible to suppress inclination of the thermistor holder 29, making it possible to maintain high detection accuracy of the thermistor 27**.

Figure 24:
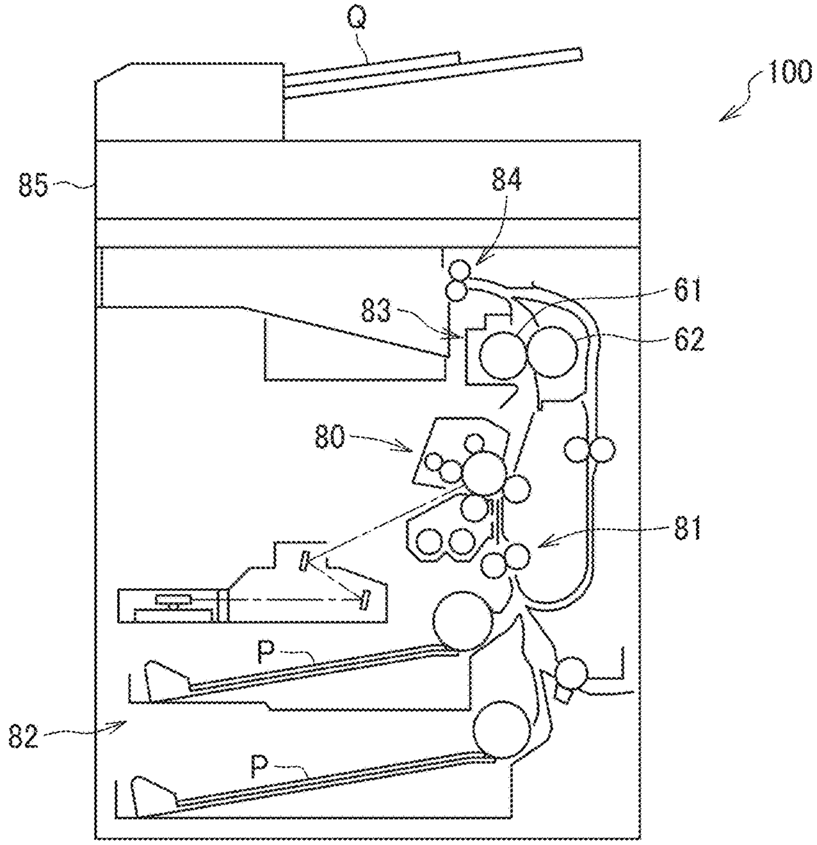
FIG. 24 is a view illustrating a configuration of another image forming apparatus.

The image forming apparatus according to the present embodiment, which is not limited to the image forming apparatus illustrated in FIG. 1, is also able to be applied to the image forming apparatus 100 as illustrated in FIG. 24. Configurations of other image forming apparatuses will now be described herein.

The image forming apparatus 100 illustrated in FIG. 24 includes an image former 80 including a photoconductor drum and the like, a paper sheet conveyor including a pair of timing rollers 81 and the like, a sheet feeder 82, a fixing device 83, a sheet ejection device 84, and a reader 85. The sheet feeder 82 includes a plurality of sheet feeding trays, and the sheet feeding trays respectively accommodate paper sheets that differ in size from each other.

The reader 85 reads an image of a document Q. The reader 85 generates image data from the read image. The sheet feeder 82 stores a plurality of paper sheets P and feeds each of the paper sheets P to a conveyance path. The timing roller 81 conveys the paper sheet P on the conveyance path to the image former 80.

The image former 80 forms a toner image on the paper sheet P. Specifically, the image former 80 includes a photoconductor drum, a charging roller, an exposure device, a developing device, a supply device, a transfer roller, a cleaning device, and an electrostatic charge eliminator. The fixing device 83 heats and presses the toner image to fix the toner image on the paper sheet P. The paper sheet P on which the toner image has been fixed is conveyed to the sheet ejection device 84 by a conveyance roller or the like. The sheet ejection device 84 ejects the paper sheet P to outside of the image forming apparatus 100.

Figure 25:
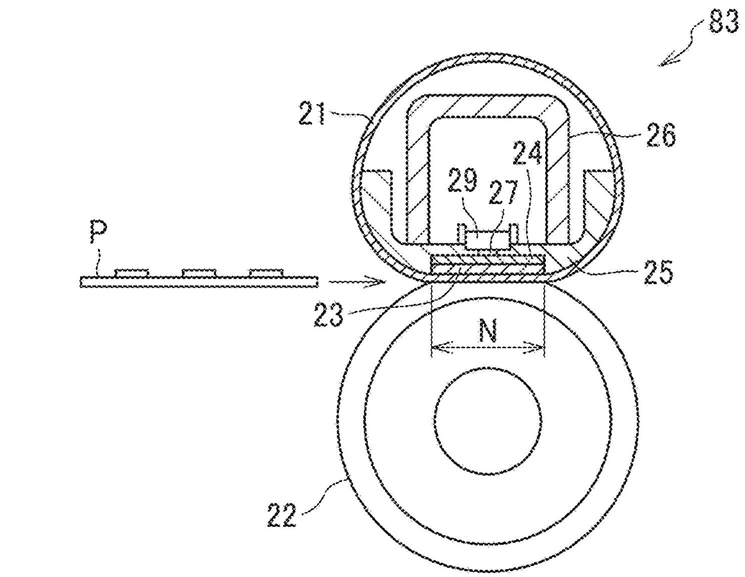
FIG. 25 is a view illustrating a configuration of a fixing device illustrated in FIG. 24.

Next, a configuration of the fixing device 83 illustrated in FIG. 24 will now be described herein with reference to FIG. 25. In FIG. 25, common portions of configurations to the portions of the configurations of the fixing device 20 illustrated in FIG. 2 are applied with identical reference numerals, and their descriptions are omitted.

The fixing device 83 illustrated in FIG. 25 includes the fixing belt 21, the pressure roller 22, the heater 23, the heat equalizing plate 24, the heater holder 25, the stay 26, the thermistor 27, the thermistor holder 29, and the like.

The nip portion N is formed between the fixing belt 21 and the pressure roller 22. A nip width of the nip portion N is 10 mm, and a linear velocity of the fixing device 83 is 240 mm/s.

The fixing belt 21 includes a polyimide substrate and a release layer, and includes no elastic layer. The release layer includes, for example, a heat-resistant film material including a fluororesin. The fixing belt 21 has an outer diameter of approximately 24 mm.

The pressure roller 22 includes a cored bar, the elastic layer, and the release layer. An outer diameter of the pressure roller 22 ranges from 24 mm to 30 mm inclusive, and a thickness of the elastic layer ranges from 3 mm to 4 mm inclusive.

The heater 23 includes a base material, a heat insulating layer, a conductor layer including a resistive heat generator and the like, and an insulating layer, and has a total thickness set to 1 mm. The heater 23 has a width of 13 mm in a paper sheet conveyance direction.

The heat equalizing plate 24 including a high thermal conductive member is disposed to be in contact with another surface opposite to one surface of the heater 23, the one surface being in contact with the inner circumferential surface of the fixing belt 21. The heater 23 and the heat equalizing plate 24 are held by the heater holder 25. The heater holder 25 is supported by the stay 26.

In the fixing device illustrated in FIG. 25, it is possible to apply the configurations of the heater holder 25, the thermistor 27, and the thermistor holder 29 according to the embodiment described above. As a result, it is possible to suppress inclination of the thermistor holder 29, making it possible to maintain high detection accuracy of the thermistor 27.

Figure 26:
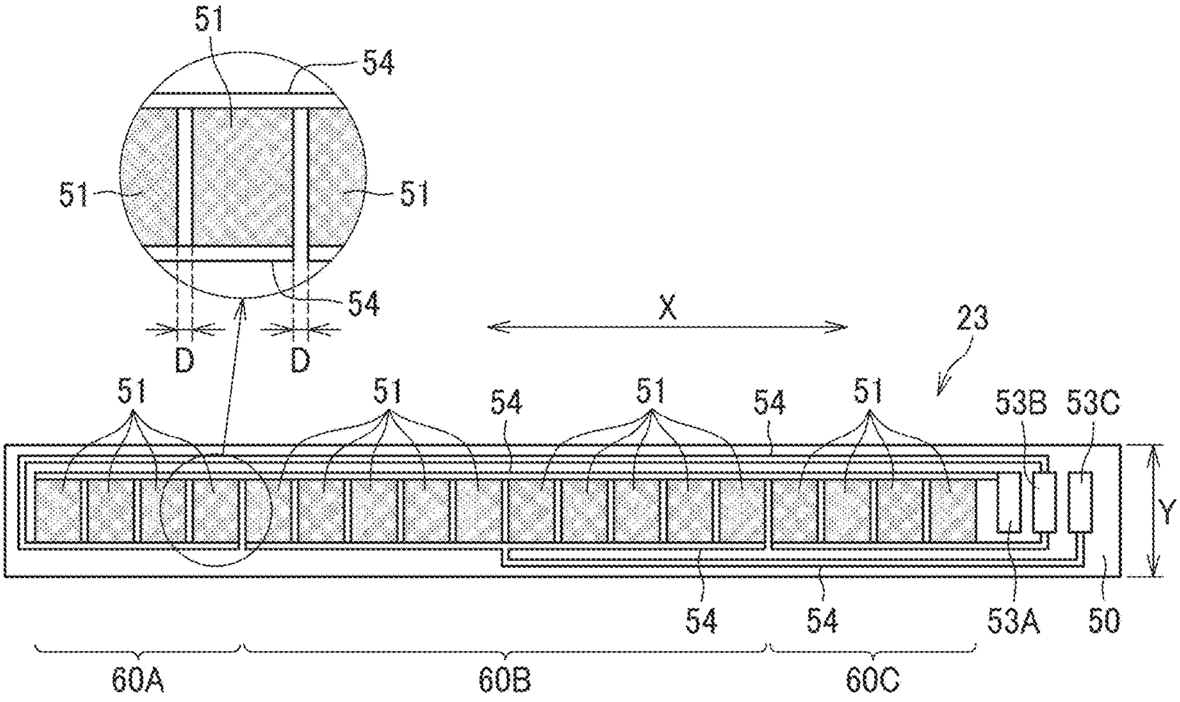
FIG. 26 is a plan view of a heater illustrated in FIG. 25.

As illustrated in FIG. 26, the conductor layer of the heater 23 includes the plurality of resistive heat generators 51, the power supply lines 54, and electrodes 53A to 53C. The plurality of resistive heat generators 51 is disposed at intervals in the longitudinal directions X of the heater 23. When a portion between each two of the resistive heat generators 51 is referred to as a "divided region", a divided region D is formed between the each two of the resistive heat generators 51, as illustrated in the enlarged view of FIG. 26 (although, in FIG. 26, the divided region D is illustrated only in a range in the enlarged view, the divided region D is provided between all twos of the resistive heat generators 51 in actual cases.). In FIG. 26, the arrowed Y directions represent the lateral directions of the heater 23, and also represent directions intersecting arrangement directions of the plurality of resistive heat generators 51 (arrangement intersecting directions) or an identical direction to the conveyance direction of a paper sheet passing through the fixing device.

The plurality of resistive heat generators 51 forms a heat generator 60B at a center, and heat generators 60A and 60C on both end sides, which are each able to generate heat independently of the heat generator at the center. For example, among the three electrodes 53A to 53C, when the electrode 53A at a left end and the electrode 53B at a center in FIG. 26 are energized, the heat generators 60A and 60C on the both end sides generate heat. When the electrodes 53A and 53C at the both ends are energized, the heat generator 60B at the center generates heat. For example, when fixing operation is performed on a small-sized paper sheet, only the heat generator 60B at the center is caused to generate heat, and, when fixing operation is performed on a large-sized paper sheet, all the heat generators 60A to 60C are caused to generate heat, making it possible to perform heating in accordance with the size of a paper sheet.

Figure 27:
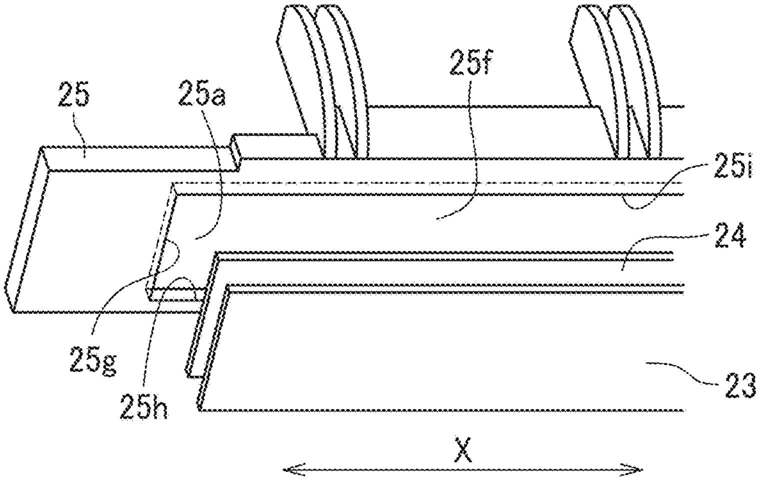
FIG. 27 is a perspective view of the heater, a heat equalizing plate, and a heater holder illustrated in FIG. 25.

As illustrated in FIG. 27, the heater holder 25 has the recess 25*a* that accommodates and holds the heater 23 and the heat equalizing plate 24. The recess 25*a* is formed, at a position facing the heater 23, on the heater holder 25. The recess 25*a* has a bottom surface 25*f* formed in a rectangular shape (oblong shape) having a substantially identical size to a size of the heater 23, and four side surfaces 25*g*, 25*h*, 25*i*, and 25*j* that are respectively provided along four sides forming an outline of the bottom surface 25*f* and that each intersect the bottom surface 25*f*. In FIG. 27, illustration of the side surface 25*j* on a right side is omitted. One side surface among the pair of side surfaces 23*g* and 25*j* (left and right) intersecting the longitudinal directions X of the heater 23 (arrangement directions of the resistive heat generators 51) may be omitted, and the recess 25*a* may be opened on one end side in the longitudinal directions of the heater 23.

Figure 28:
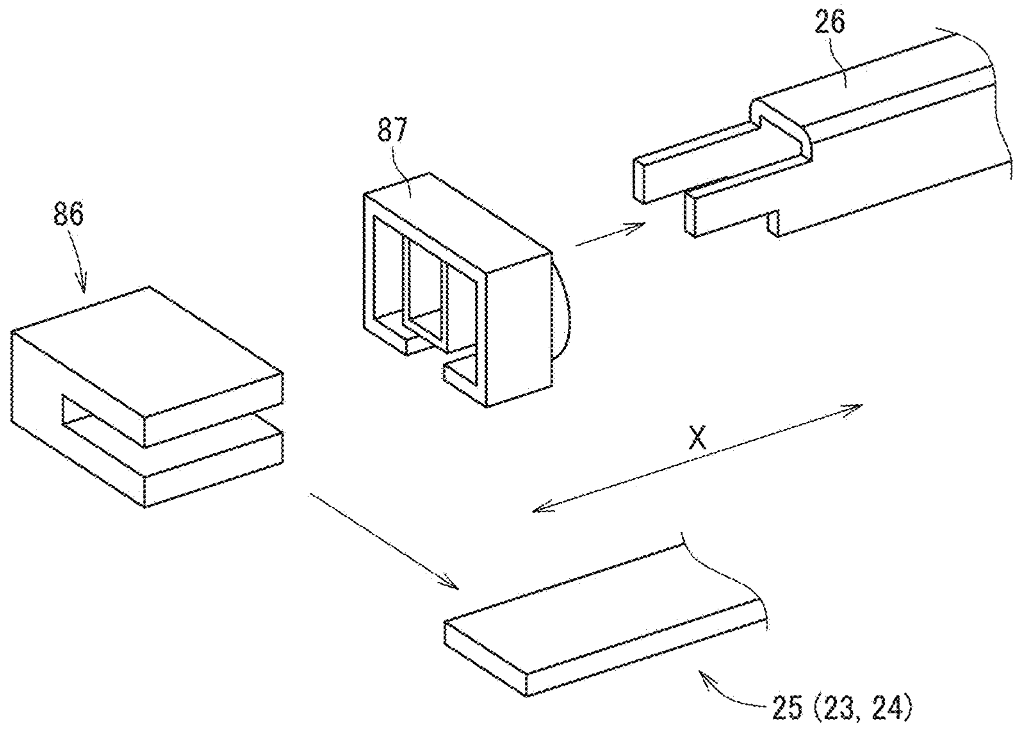
FIG. 28 is a view illustrating a method for attaching a connector to the heater holder illustrated in FIG. 25.

As illustrated in FIG. 28, the heater holder 25 that holds the heater 23 and the heat equalizing plate 24 is held by a connector 86. The connector 86 includes a housing including a resin (for example, LCP), a plurality of contact terminals provided in the housing, and the like.

The connector 86 is attached, with respect to the heater holder 25, in a direction intersecting the longitudinal directions X of the heater 23 (arrangement directions of the resistive heat generators 51) (see an arrow direction extending from the connector 86 in FIG. 28). In a state where the connector 86 is attached, the heater 23, the heat equalizing plate 24, and the heater holder 25 are held and pinched by the connector 86 from its front and back sides. In this state, as each of the contact terminals comes into contact (pressure contact) with each of the electrodes of the heater 23, each of the resistive heat generators 51 and the power supply provided in the image forming apparatus are electrically coupled to each other via the connector 86. As a result, such a state is attained that it is possible to supply power from the power supply to each of the resistive heat generators 51.

A flange 87 illustrated in FIG. 28 is a belt holder that is provided at both ends in the longitudinal directions of the fixing belt 21 and holds the both ends of the fixing belt 21 from inside. The flange 87 is inserted into both ends of the stay 26 and fixed to a pair of side plates serving as frame members of the fixing device.

Figure 29:
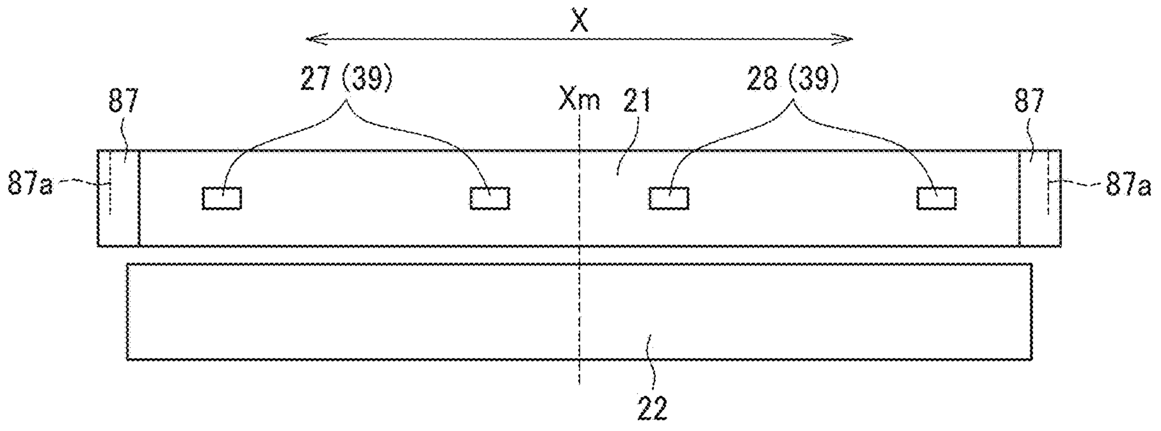
FIG. 29 is a view illustrating arrangement of temperature sensors illustrated in FIG. 25.

FIG. 29 is a view illustrating arrangement of temperature sensors 39.

As illustrated in FIG. 29, the temperature sensors 39 include the thermistors 27 for temperature control and the thermostats 28 for preventing an excessive increase in temperature. The two thermistors 27 are disposed nearer to one end side than a center Xm in the longitudinal directions of the fixing belt 21. The two thermostats 28 are disposed nearer to another end side than the center Xm in the longitudinal directions of the fixing belt 21.

Figure 30:
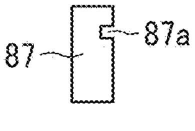
FIG. 30 is a view illustrating a groove on a flange illustrated in FIG. 28.

As illustrated in FIGS. 29 and 30, a slide groove 87*a* is provided on the flange 87 that holds the both ends of the fixing belt 21. The slide groove 87*a* extends in contact-and-separation directions of the fixing belt 21 with respect to the pressure roller 22. An engager of a housing of the fixing device engages the slide groove 87*a*. The fixing belt 21 is configured to be movable in the contact-and-separation directions with respect to the pressure roller 22 as the engager relatively moves in the slide groove 87*a*.

Figure 31:
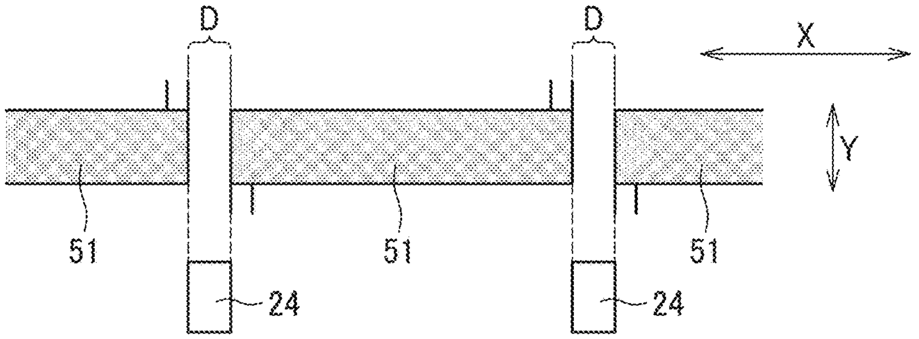
FIG. 31 is a view illustrating another arrangement example of the heat equalizing plates.
Figure 32:
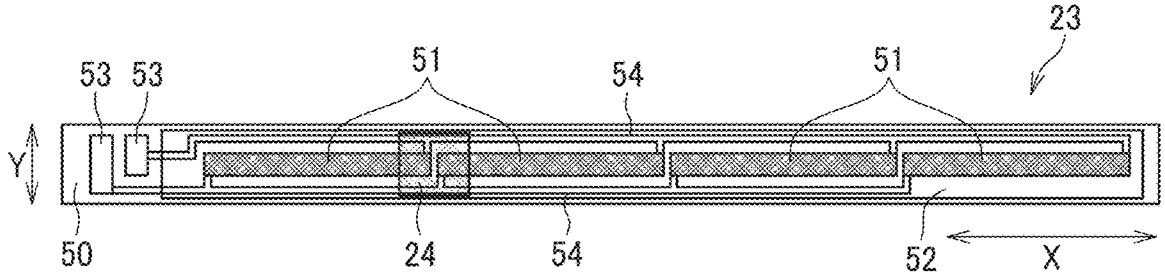
FIG. 32 is a view illustrating still another arrangement example of the heat equalizing plates.

A range in which the heat equalizing plate 24 is disposed is not limited to the whole heat generating region in the longitudinal directions X of the heater 23. For example, similar to the example illustrated in FIG. 31, the heat equalizing plates 24 may be disposed each only in the divided region D between each two of the resistive heat generators 51. The divided regions D and the heat equalizing plates 24, although which are shifted from each other in the upper and lower directions in the drawing for purposes of convenience in FIG. 31, are respectively disposed at substantially identical positions in the lateral directions Y of the heater 23. The heat equalizing plate 24 may be disposed over a part of the divided region D in the lateral directions Y of the heater 23, or may be disposed wholly over the divided region D in the lateral directions Y of the heater 23. As illustrated in FIG. 32, the heat equalizing plate 24 may be disposed across each two of the resistive heat generators 51, which are present on both sides pinching each of the divided regions D, in addition to the divided regions D each between each two of the resistive heat generators 51. That is, the heat equalizing plate 24 may be disposed to overlap at least respective parts of each two of the resistive heat generators 51, which are present on both sides pinching each of the divided regions D. The heat equalizing plates 24 may be respectively disposed in all the divided regions D in the heater 23, or may be disposed only in some of the divided regions D, similar to the example illustrated in FIG. 32.

The heat equalizing plate 24, which is disposed in the divided region D on the heater 23, makes it possible to improve heat conduction efficiency in the divided region D where a calorific value is small, and to suppress a decrease in temperature in the divided region D. As a result, it is possible to suppress unevenness in temperature in the longitudinal directions of the heater 23, making it possible to suppress unevenness in temperature in the longitudinal directions of the fixing belt 21. As a result, it is possible to suppress unevenness in fixing and unevenness in gloss of an image fixed to a paper sheet. It is not necessary to increase a calorific value of the heater 23 to ensure sufficient fixing performance in the divided region D, making it possible to achieve energy saving in the fixing device. In particular, when the heat equalizing plate 24 is disposed wholly over the heat generating region where the resistive heat generators 51 are disposed, it is possible to improve heat transfer efficiency of the heater 23 wholly in a main heating region (that is, an image forming region on a paper sheet that passes through) by the heater 23, suppressing unevenness in temperature in the longitudinal directions of the heater 23 and the fixing belt 21.

The combination of the heat equalizing plate 24 and the resistive heat generators 51 having positive temperature coefficient of resistance (PTC) characteristics makes it possible to more effectively suppress an excessive increase in temperature in the non-passing-through region through which no paper sheet passes. The PTC characteristics refer to characteristics that a resistance value increases as a temperature increases (when a constant voltage is applied, a heater output decreases.). That is, the resistive heat generators 51 having the PTC characteristics make it possible to effectively suppress a calorific value of each of the resistive heat generators 51 in the non-passing-through region, and the heat equalizing plate 24 makes it possible to allow a heat quantity to be dispersed in the non-passing-through region, both of which present synergistic effects making it possible to effectively suppress an excessive increase in temperature due to the non-passing-through region.

Figure 33:
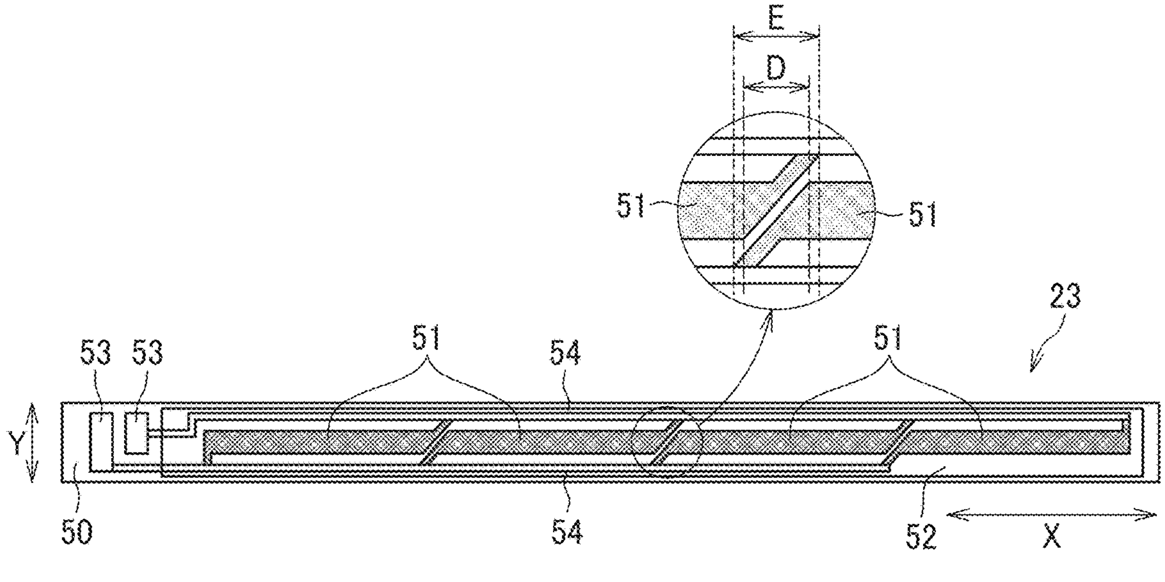
FIG. 33 is a view illustrating an enlarged divided region of the heater.

Since the temperature of heater 23 tends to decrease not only in the divided region D but also in its peripheral area, the heat equalizing plate 24 may be disposed in an enlarged divided region E including the divided region D and the peripheral area illustrated in FIG. 33. As a result, in the enlarged divided region E including the divided region D, it is possible to improve heat transfer efficiency, making it possible to more effectively suppress unevenness in temperature in the longitudinal directions X of the heater 23.

Next, still another fixing device will now be described herein.

Figure 34:
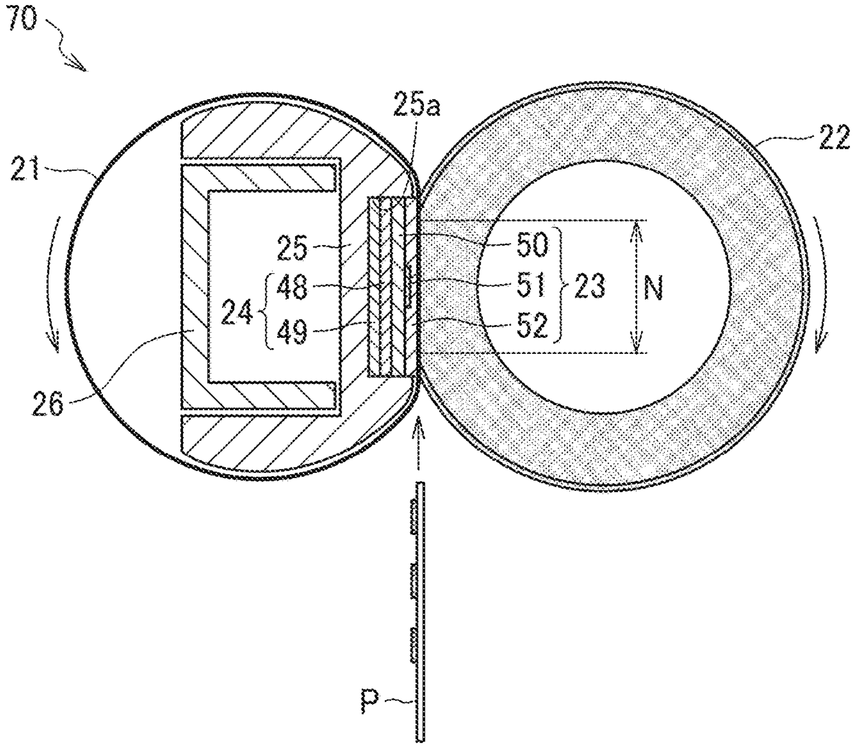
FIG. 34 is a view illustrating a configuration of still another fixing device.

In a fixing device 70 illustrated in FIG. 34, the heat equalizing plate 24 includes two heat equalizing plates 48 and 49. That is, the first heat equalizing plate 48 that is in contact with the heater 23 and the second heat equalizing plate 49 that is in contact with the first heat equalizing plate 48 are provided. Although, in the example illustrated in FIG. 34, a thermostat that is in contact with the heater 23 is also provided, FIG. 34 illustrates a cross section in which neither thermistor nor thermistor holder is disposed.

The second heat equalizing plate 49 includes a member that is higher in rate of thermal conductivity than the base material 50 of the heater 23, such as graphene or graphite. One example of such a member is a graphite sheet having a thickness of 1 mm. The second heat equalizing plate 49 may include a plate material such as aluminum, copper, or silver.

Figure 35:
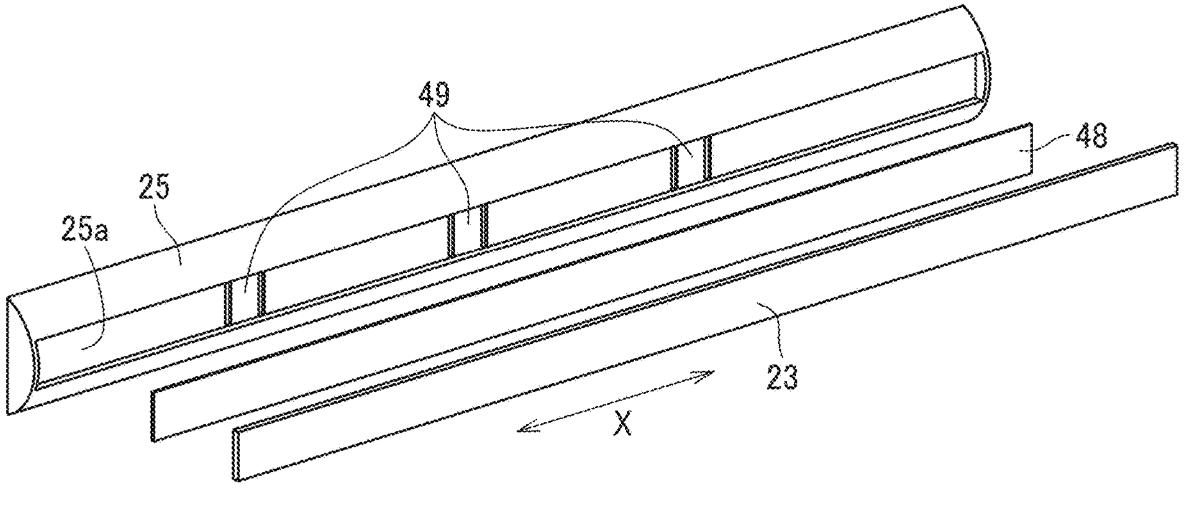
FIG. 35 is a perspective view of the heater, a first heat equalizing plate, second heat equalizing plates, and a heater holder illustrated in FIG. 34.

As illustrated in FIG. 35, the plurality of second heat equalizing plates 49 is disposed respectively in the recess 25*a* on the heater holder 25. An interval extending in the longitudinal directions X of the heater 23 is present in an interposed manner between each two of the second heat equalizing plates 49. In portions on the heater holder 25, where the second heat equalizing plates 49 are provided, recesses that are each deeper one step than other portions are formed.

Figure 36:
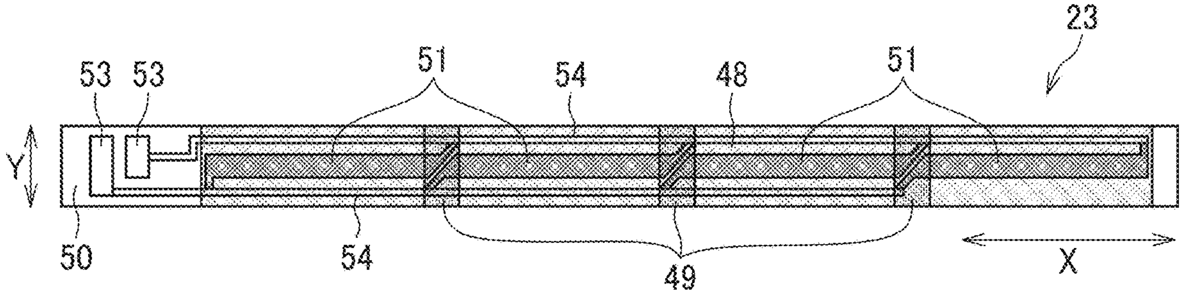
FIG. 36 is a view illustrating arrangement of the first heat equalizing plate and the second heat equalizing plates.

As illustrated in FIG. 36, the second heat equalizing plates 49 (see hatched portions) are disposed to each overlap at least parts of each two of the resistive heat generators 51, which pinch each of the divided regions D, in the longitudinal directions X of the heater 23. The first heat equalizing plate 48 is disposed wholly over the heat generating region where all the resistive heat generators 51 are disposed. An arrangement range of the first heat equalizing plate 48 and the second heat equalizing plates 49 is not limited to this case.

Figure 37:
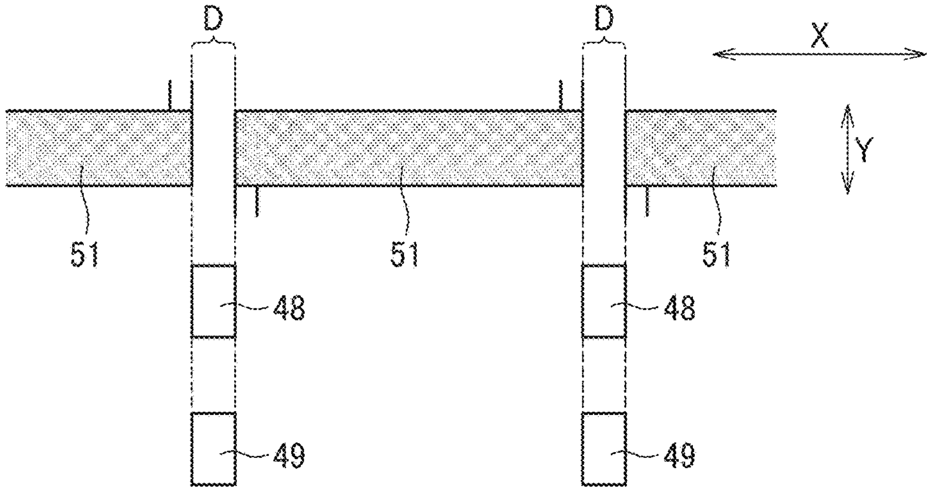
FIG. 37 is a view illustrating another arrangement example of the first heat equalizing plates and the second heat equalizing plates.

The second heat equalizing plates 49 each disposed to overlap at least the parts of each two of the resistive heat generators 51, which pinch each of the divided regions D, make it possible to further improve heat transfer efficiency in the divided regions D, more effectively suppressing unevenness in temperature in the longitudinal directions X of the heater 23. As illustrated in FIG. 37, the first heat equalizing plate 48 and the second heat equalizing plate 49 may be disposed only in an overlapping range wholly in the divided region D. In this case, in particular, it is possible to improve heat transfer efficiency in the divided region D. The divided regions D, the first heat equalizing plates 48, and the second heat equalizing plates 49, although which are shifted from each other in the upper and lower directions in the drawing for purposes of convenience in FIG. 37, are respectively disposed at substantially identical positions in the lateral directions Y of the heater 23. However, the present embodiment is not limited to this case, and the first heat equalizing plate 48 and the second heat equalizing plate 49 may be disposed over a part of the divided region D in the lateral directions Y of the heater 23, or may be disposed wholly over the divided region D in the lateral directions Y of the heater 23.

Both the first heat equalizing plate 48 and the second heat equalizing plate 49 may each include a graphene sheet. In this case, it is possible to form the first heat equalizing plate 48 and the second heat equalizing plate 49 each having a high rate of thermal conductivity in a predetermined direction along a surface of graphene, that is, in the longitudinal directions, instead of the thickness directions, making it possible to effectively suppress unevenness in temperature in the longitudinal directions of the heater 23 and the fixing belt 21.

Figure 40:
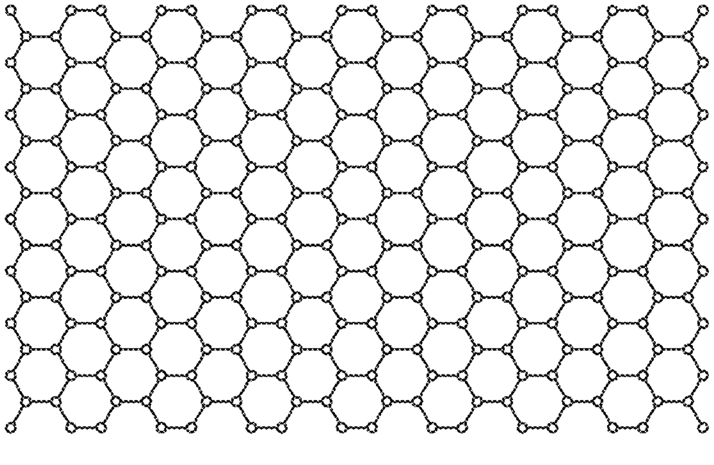
FIG. 40 is a view illustrating an atomic crystal structure of graphene.

Graphene is present in flaky powder form. As illustrated in FIG. 40, graphene has a planar hexagonal lattice structure of carbon atoms. A graphene sheet refers to graphene in sheet form, and usually has a single layer. The graphene sheet may contain an impurity in a single layer of carbon, or may have a fullerene structure. The fullerene structure is generally recognized as a compound achieved by forming a polycyclic body in which carbon atoms identical in number to each other are condensed in a cage form with 5-membered rings and 6-membered rings, and corresponds to, for example, another closed cage structure of C60, C70, and C80 fullerene or having three-coordinate carbon atoms.

The graphene sheet is an artifact and may be prepared through, for example, a chemical vapor deposition (CVD) method.

As the graphene sheet, it is possible to use a commercially available product. A size and a thickness of the graphene sheet, a number of layers in the graphite sheet, which will be described later, and the like are measured by using, for example, a transmission type electron microscope (TEM).

Figure 41:
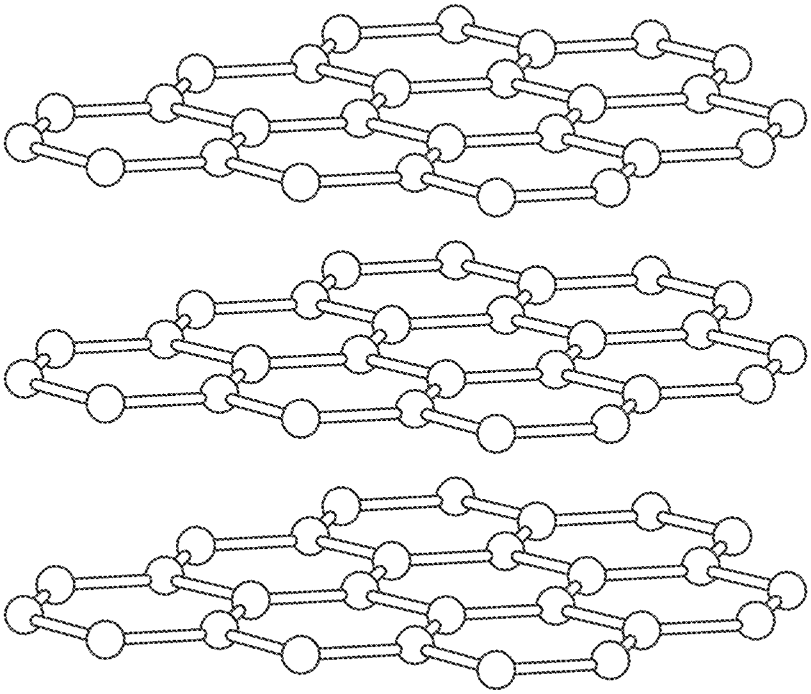
FIG. 41 is a view illustrating the atomic crystal structure of graphite.

Graphite, in which layers of graphene are laminated with each other, presents large thermal conduction anisotropy. As illustrated in FIG. 41, graphite includes a plurality of layers in each of which a surface of a fused six-membered ring layer of carbon atoms spreads in a planar shape, and has a crystal structure in which the plurality of layers overlap with each other. Between each two of the carbon atoms in this crystal structure, the carbon atoms adjacent to each other in each of the layers are coupled to each other through covalent bonding, and the carbon atoms between each two of the layers are coupled to each other through van der Waals bonding. Covalent bonding is larger in bonding force than van der Waals bonding, and presents large anisotropy in bonding within a layer and in bonding between the layers. That is, using graphite to configure the heat equalizing plate 24 including the first heat equalizing plate 48 and the second heat equalizing plate 49, in which heat transfer efficiency in the longitudinal directions of the heat equalizing plate 24 becomes larger than heat transfer efficiency in the thickness directions (that is, stacking directions of the members), makes it possible to suppress transfer of heat to the heater holder 25. It is possible to efficiently suppress unevenness in temperature in the longitudinal directions X of the heater 23, minimizing an amount of heat flowing out toward the heater holder 25. Using graphite to configure the heat equalizing plate 24 also makes it possible to achieve the heat equalizing plate 24 that is excellent in heat resistance, which withstands oxidation at a maximum temperature of approximately 700 degrees.

It is possible to appropriately change physical properties and dimensions of a graphite sheet to achieve a desired function for the heat equalizing plate 24. For example, using high purity graphite or single-crystal graphite or increasing a graphite sheet in thickness makes it possible to improve thermal conduction in anisotropy. To achieve a high-speed fixing device, a graphite sheet having a small thickness may be used to reduce heat capacity of the fixing device. When the nip portion N and the heater 23 are large in width, the heat equalizing plate 24 may be increased in width in the longitudinal directions accordingly.

From a viewpoint of improving mechanical strength, layers in a graphite sheet may preferably be 11 or more in number. A graphite sheet may partially have portions of a single layer and a multilayer.

Figure 38:
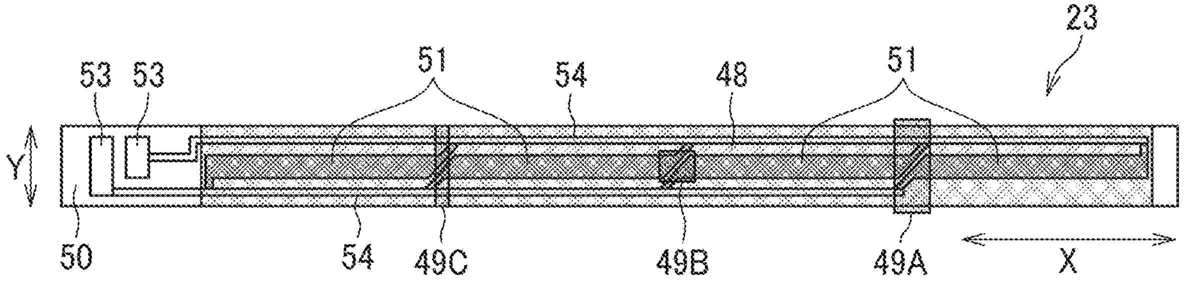
FIG. 38 is a view illustrating still another arrangement example of the second heat equalizing plates.

As to the second heat equalizing plate 49, it is sufficient that the plate be provided at a position overlapping the divided region D and at least parts of each two of the resistive heat generators 51, which are present on both sides of the divided region, in the longitudinal directions X of the heater 23, and its arrangement is not limited to the arrangement illustrated in FIG. 37. For example, similar to the example illustrated in FIG. 38, the second heat equalizing plate 49 may be provided to protrude from both sides of the base material 50 of the heater 23 in the lateral directions Y of the heater 23. The second heat equalizing plate 49 may be provided within a range where the resistive heat generators 51 are provided in the lateral directions Y of the heater 23. The second heat equalizing plate 49 may be provided in a part of the divided region D.

Figure 39:
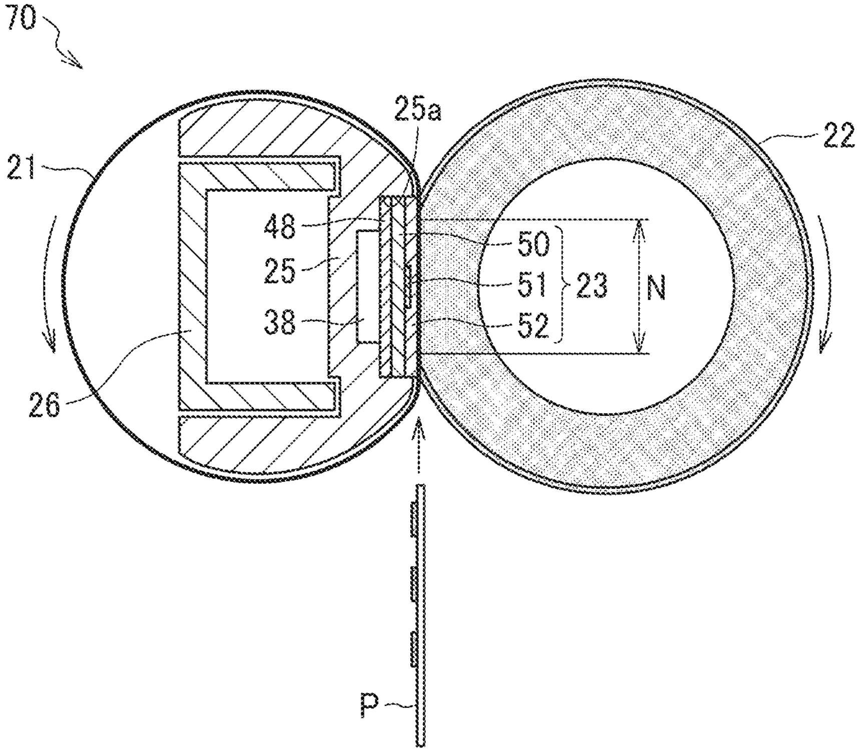
FIG. 39 is a view illustrating an example where a gap is provided between the first heat equalizing plate and the heater holder.

Similar to the example illustrated in FIG. 39, a gap 38 in the thickness directions (left and right directions illustrated in FIG. 39) may be provided between the first heat equalizing plate 48 and the heater holder 25. That is, the gap 38 serving as a heat insulating layer is provided in a partial region in the recess 25*a* (see FIG. 35) on the heater holder 25 in which the heater 23, the first heat equalizing plate 48, and the second heat equalizing plate 49 are disposed. The gap 38 is provided in a partial region other than a portion where the second heat equalizing plate 49 is provided. The gap 38 is formed by setting a depth of the recess 25*a* on the heater holder 25 to be deeper than a depth of another portion.

As a result, it is possible to reduce a contact area between the heater holder 25 and the first heat equalizing plate 48, making it possible to suppress transfer of heat from the first heat equalizing plate 48 to the heater holder 25 to efficiently heat the fixing belt 21. At a location where the second heat equalizing plate 49 is provided, as illustrated in FIG. 34, the second heat equalizing plate 49 is in contact with and held on the bottom surface of the recess 25*a* on the heater holder 25.

The gap 38 is provided wholly over a range where the resistive heat generators 51 are provided in the lateral directions Y of the heater 23 (the upper and lower directions illustrated in FIG. 39). As a result, it is possible to effectively suppress transfer of heat from the first heat equalizing plate 48 to the heater holder 25, improving heating efficiency of the fixing belt 21 by the heater 23. A heat insulating member that is lower in rate of thermal conductivity than the heater holder 25 may be provided in the gap 38.

The first heat equalizing plate 48 and the second heat equalizing plate 49 are not limited to be configured separately from each other, but may be integrated with each other. That is, a portion of the first heat equalizing plate 48, which corresponds to the divided region D, may be formed to be thicker than another portion to allow the first heat equalizing plate 48 to also function as the second heat equalizing plate 49.

Figure 42:
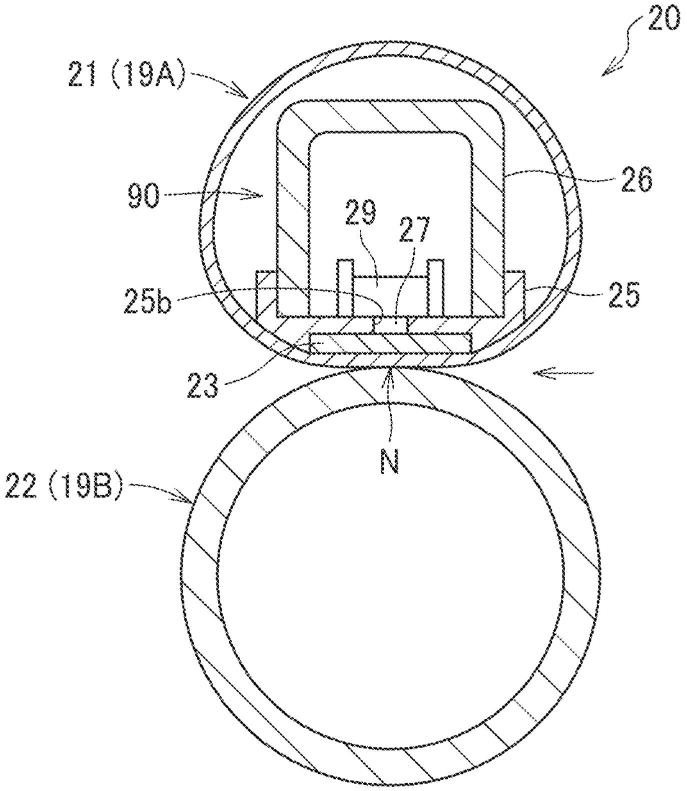
FIG. 42 is a view illustrating a configuration of still another fixing device.

The fixing device 20 illustrated in FIG. 42 has no heat equalizing plate, and the thermistor 27 directly abuts the heater 23 via the through hole 25*b* provided on the heater holder 25. The heater 23 is a planar heating body having the resistive heat generators provided on the base material. The heater holder 25 includes a heat-resistant resin.

Although the configurations of the fixing device and the image forming apparatus have been described above, applying the present embodiment also to the fixing device and the image forming apparatus having such configurations makes it possible to obtain similar or identical effects to the effects of the embodiment described above. That is, applying the present embodiment makes it possible to suppress inclination of the thermistor holder 29, and to maintain high detection accuracy of the thermistor 27.

A heating device includes: a rotator; a heater extending in a first direction to heat the rotator; a temperature detector to detect a temperature of the heater; a holder holding the temperature detector; an electric wire; and a biasing member to bias the temperature detector toward the heater via the holder in a second direction intersecting the first direction. The holder includes: a pair of supports parallel to each other in a third direction intersecting the first direction and the second direction, the pair of supports extend in the first direction; a wiring space between the pair of supports and accommodatable a part of the electric wire; and a slit between the pair of supports and communicating with the wiring space, the slit being insertable the electric wire to the wiring space.

The slit extends in a fourth direction inclined relative to the first direction. The slit has a meandering slit. The biasing member is detachably attachable to the holder, and the slit has a width larger than a diameter of the electric wire when the biasing member is not attached to the holder. The slit has a width smaller than a diameter of the electric wire. The biasing member has a coil spring, the pair of supports respectively include a pair of attachments detachably attachable the biasing member, the biasing member has an inner diameter, and the pair of attachments has an outer diameter larger than the inner diameter of the biasing member when the biasing member is not attached to the pair of attachments.

The slit has a width: larger than a diameter of the electric wire when the biasing member is not attached to the pair of attachments; and smaller than the diameter of the electric wire when the biasing member is attached to the pair of attachments. A fixing device includes: the heating device to: heat a recording medium; and fix an image on the recording medium. An image forming apparatus includes the fixing device.

The present embodiment is not limited to a case of being applied to a fixing device that is an example of a heating device, and is also applicable to a heating device other than the fixing device. For example, the present embodiment is also applicable to a drying device that dries liquid such as ink applied onto a paper sheet, a laminator that heats, presses, and bonds a film serving as a covering member to a surface of a sheet such as a paper sheet, and a heating device such as a heat sealer that heats, presses, and bonds seals on a packaging material. As a result, it is possible to suppress inclination of the holder.

In the present embodiment, it is possible to suppress inclination of the holder.

Aspects of the present disclosure are, for example, as described below.

Aspect 1

According to Aspect 1, a heating device includes: a rotator; a contact type temperature detector; a holder that holds the temperature detector; an electric wire extending in first directions; and a biasing member that biases the temperature detector toward a detection-target member via the holder, in which, when a direction in which the temperature detector is biased and its opposite direction, the directions intersecting the first directions, are defined as second directions, and directions orthogonal to the first directions, the directions intersecting the second directions, are defined as third directions, the holder includes a pair of supports provided in parallel to each other in the third directions and provided to extend in the second directions, a pair of supported portions respectively supported by the supports and provided to extend in the third directions, and a wiring space surrounded by the pair of supports and the pair of supported portions and used to wire the electric wire, and a slit provided to extend in the first directions between the pair of supported portions and communicating with the wiring space.

Aspect 2

According to Aspect 2, in the heating device of Aspect 1, extending directions of the slit are inclined with respect to the first directions.

Aspect 3

According to Aspect 3, in the heating device of Aspect 1, the slit is provided in a meandering manner.

Aspect 4

According to Aspect 4, in the heating device of any one of Aspects 1 to 3, the biasing member is attached to the holder, and a width of the slit is larger than a diameter of the electric wire when the biasing member is not attached to the holder.

Aspect 5

According to Aspect 5, in the heating device of any one of Aspects 1 to 4, a width of the slit is smaller than a diameter of the electric wire.

Aspect 6

According to Aspect 6, in the heating device of any one of Aspects 1 to 4, the biasing member is a coil spring, the holder includes a pair of attachments respectively provided on the supported portions, to which the biasing member is attached, and an outer diameter formed by the pair of attachments is larger than an inner diameter of the biasing member when the biasing member is not attached to the pair of attachments.

Aspect 7

According to Aspect 7, in the heating device of Aspect 6, a width of the slit is larger than a diameter of the electric wire when the biasing member is not attached to the pair of attachments, and the width of the slit is smaller than the diameter of the electric wire when the biasing member is attached to the pair of attachments.

Aspect 8

According to Aspect 8, a fixing device heats a recording medium using the heating device of any one of Aspects 1 to 7 to fix an image on the recording medium to the recording medium.

Aspect 9

According to Aspect 9, an image forming apparatus includes the fixing device of Aspect 8.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:

a rotator;

a heater extending in a first direction to heat the rotator;

a temperature detector to detect a temperature of the heater;

a holder holding the temperature detector;

an electric wire; and a biasing member to bias the temperature detector toward the heater via the holder in a second direction intersecting the first direction, wherein the holder includes:

a pair of supports parallel to each other in a third direction intersecting the first direction and the second direction, the pair of supports extend in the first direction;

a wiring space between the pair of supports, a part of the electric wire being accommodatable in the wiring space; and a slit between the pair of supports and communicating with the wiring space, the electric wire being insertable through the slit to the wiring space.

2. The heating device according to claim 1, wherein the slit extends in a fourth direction inclined relative to the first direction.

3. The heating device according to claim 1, wherein the slit has a meandering slit.

4. The heating device according to claim 1, wherein the biasing member is detachably attachable to the holder, and the slit has a width larger than a diameter of the electric wire when the biasing member is not attached to the holder.

5. The heating device according to claim 1, wherein the slit has a width smaller than a diameter of the electric wire.

6. The heating device according to claim 1, wherein the biasing member has a coil spring, the pair of supports respectively include a pair of attachments detachably attachable to the biasing member, the biasing member has an inner diameter, and the pair of attachments has an outer diameter larger than the inner diameter of the biasing member when the biasing member is not attached to the pair of attachments.

7. The heating device according to claim 6, wherein the slit has a width:

larger than a diameter of the electric wire when the biasing member is not attached to the pair of attachments; and smaller than the diameter of the electric wire when the biasing member is attached to the pair of attachments.

8. A fixing device comprising:

the heating device according to claim 1 to:

heat a recording medium; and fix an image on the recording medium.

9. An image forming apparatus comprising the fixing device according to claim 8.

* * * * *